(12) United States Patent
Bhalakia et al.

(10) Patent No.: US 7,048,997 B2
(45) Date of Patent: May 23, 2006

(54) PRODUCTION OF OPTICAL ELEMENTS

(75) Inventors: Sujal Bhalakia, Plymouth, MN (US); Thomas J. Moravec, Maple Grove, MN (US)

(73) Assignee: Vision-Ease Lens, Ramsey, MN (US)

( * ) Notice: Subject to any disclaimer, the term of this patent is extended or adjusted under 35 U.S.C. 154(b) by 13 days.

(21) Appl. No.: 09/848,594

(22) Filed: May 3, 2001

(65) Prior Publication Data

US 2001/0035935 A1 Nov. 1, 2001

Related U.S. Application Data

(63) Continuation-in-part of application No. 09/425,517, filed on Oct. 22, 1999, now Pat. No. 6,328,446, which is a continuation-in-part of application No. 08/905,432, filed on Aug. 4, 1997, now Pat. No. 5,856,860, which is a continuation-in-part of application No. 08/454,934, filed on May 31, 1995, now Pat. No. 5,757,459, which is a continuation-in-part of application No. 08/397,949, filed on Mar. 3, 1995, now abandoned.

(51) Int. Cl.
*B32B 27/30* (2006.01)
*B32B 27/38* (2006.01)
*B32B 27/40* (2006.01)
*G02C 7/02* (2006.01)

(52) U.S. Cl. .................. 428/339; 428/414; 428/423.1; 428/522; 359/166

(58) Field of Classification Search ............ 429/411.1, 429/414, 412, 423.1, 500, 522; 351/159, 351/163, 165, 164, 166; 428/339

See application file for complete search history.

(56) References Cited

U.S. PATENT DOCUMENTS

| | | | |
|---|---|---|---|
| 3,051,054 A | 8/1962 | Crandon | 88/65 |
| 3,786,119 A | 1/1974 | Ortlieb | 264/2 |
| 3,846,013 A | 11/1974 | Cohen | 350/147 |
| 3,877,798 A | 4/1975 | Tolar et al. | 351/168 |
| 3,940,304 A | 2/1976 | Schuler | 156/245 |
| 4,268,134 A | 5/1981 | Gulati et al. | 351/163 |
| 4,495,015 A | 1/1985 | Petcen | 156/80 |
| 4,645,317 A | 2/1987 | Frieder et al. | 351/164 |
| 4,679,918 A | 7/1987 | Ace | 351/163 |
| 4,781,452 A | 11/1988 | Ace | 351/177 |
| 4,793,703 A | 12/1988 | Fretz, Jr. | 351/163 |
| 4,867,553 A | 9/1989 | Frieder | 351/172 |
| 4,873,029 A | 10/1989 | Blum | 264/1.3 |
| 4,883,548 A | 11/1989 | Onoki | 156/99 |

(Continued)

FOREIGN PATENT DOCUMENTS

EP 0299 509 1/1989

(Continued)

OTHER PUBLICATIONS

Frames Product Guide Lenses, Winter/Spring 1993, Jan. 1993.

(Continued)

*Primary Examiner*—Ramsey Zacharia
(74) *Attorney, Agent, or Firm*—Inskeep IP Group, Inc.

(57) ABSTRACT

A method of making an optical element that includes a thermoplastic power portion, the method including laminating a first thermoplastic sheet to one side of a functional film, laminating a second thermoplastic sheet to a second side of the functional film, and affixing either the first thermoplastic sheet or the second thermoplastic sheet to the power portion, with the other of the first or second thermoplastic sheets being open to atmosphere.

34 Claims, 3 Drawing Sheets

U.S. PATENT DOCUMENTS

| | | | |
|---|---|---|---|
| 4,917,851 A | 4/1990 | Yamada et al. | |
| 5,051,309 A | 9/1991 | Kawaki et al. | 428/332 |
| 5,073,423 A | 12/1991 | Johnson et al. | 428/40 |
| 5,149,181 A | 9/1992 | Bedford | |
| 5,223,862 A | 6/1993 | Dasher et al. | 351/163 |
| 5,268,231 A | 12/1993 | Knapp-Hayes | 428/409 |
| 5,286,419 A | 2/1994 | Van Ligten et al. | 264/1.3 |
| 5,434,707 A | 7/1995 | Dalzell et al. | |
| 5,531,940 A | 7/1996 | Gupta et al. | 264/1.7 |
| 5,631,720 A * | 5/1997 | Guglielmetti et al. | 351/163 |
| 5,702,813 A | 12/1997 | Murata et al. | 428/332 |
| 5,757,459 A | 5/1998 | Bhalakia et al. | |
| 5,800,744 A | 9/1998 | Munakata | 264/1.7 |
| 5,827,614 A | 10/1998 | Bhalakia et al. | |
| 5,856,860 A | 1/1999 | Bhalakia et al. | |
| 6,328,446 B1 | 12/2001 | Bhalakia et al. | |
| 2001/0035935 A1 | 11/2001 | Bhalakia et al. | |

FOREIGN PATENT DOCUMENTS

| | | |
|---|---|---|
| JP | 56-13139 | 2/1981 |
| JP | 60-195515 | 10/1985 |
| JP | 61-032004 | 2/1986 |
| JP | 61-32004 | 2/1986 |
| JP | 64-22538 | 1/1989 |
| JP | 03-132701 | 6/1991 |
| JP | 6-238689 | 8/1994 |
| JP | 61-5910 | 1/1996 |
| JP | 63-061203 | 3/1998 |

OTHER PUBLICATIONS

Coated Film Insert Injection Process, Oct. 1988, pp. 122-128, Rev. 1993.8, Lot No. 93 08 2000 DPR.

Material Safety Data Sheet, Jun. 1, 1995, pp. 259-257, Mitsubishi Engineering Plastics Corp.

ORCOLITE ®Releases The Industry's First Prescription Polarized Polycarbonate Lens—PolarPoly[198], Press Release, Oct. 2, 1995, Azusa, California.

* cited by examiner

PRODUCTION OF OPTICAL ELEMENTS

RELATED APPLICATIONS

This application is a continuation-in-part of U.S. patent application Ser. No. 09/425,517, filed Oct. 22, 1999 now U.S. Pat. No. 6,328,446 and titled "PRODUCTION OF OPTICAL ELEMENTS" which is a continuation in part of U.S. patent application Ser. No. 08/905,432 filed on Aug. 4, 1997 titled "Multi-focal Optical Elements", now U.S. Pat. No. 5,856,860, which is turn a continuation-in-part of U.S. patent application Ser. No. 08/454,934, filed May 31, 1995, and titled MULTIFOCAL OPTICAL ELEMENTS, now U.S. Pat. No. 5,757,459, which is in turn a Continuation-In-Part of U.S. patent application Ser. No. 08/397,949, filed on Mar. 3, 1995 for PRODUCTION OF OPTICAL ELEMENTS, now abandoned.

BACKGROUND OF THE INVENTION

1. Field of the Invention

The present invention relates to optical elements and to methods of making optical elements. More specifically, the present invention relates to an optical element that incorporates a laminate to provide a functional property and to a method of incorporating the functional property in the optical element by adherence of the laminate to an optical power lens element.

2. Background of the Art

Manufacturers have encountered and overcome numerous technical challenges presented by chemical compounds that are newly incorporated into optical elements, such as ophthalmic lenses. First, there were new formulations for inorganic glasses. Those new glass formulations required development of new processing steps and conditions, as well as new grinding and polishing techniques. Later, industry focus shifted to thermoset resins and polymers, such as allyl diglycol carbonate, one brand of which is sold under the CR-39® trademark of PPG Industries, Inc. A more recent development involves manufacture of ophthalmic lenses using thermoplastic materials and polymers, such as polycarbonate polymers.

Polycarbonate is an amorphous, thermoplastic material that has mechanical properties that are very desirable for ophthalmic lenses. For example, ophthalmic lenses made of polycarbonate have unusually high impact resistance and strength which make the lenses surprisingly shatter-resistant. Also, the relatively low specific gravity of polycarbonate makes it possible to significantly decrease the weight of polycarbonate lenses, as compared to glass or CR-39® lenses. Polycarbonate is highly transparent and has a desirably high refractive index for ophthalmic lens applications. Furthermore, the good thermal properties of molten polycarbonate makes the material conducive to efficient processing by conventional techniques, such as injection molding.

Despite the advantages of the material, incorporation of polycarbonate into ophthalmic lens manufacture has not been without problems. For example, the hardness of the material necessitated development of grinding and polishing techniques different from techniques used for glass and CR-39® lenses. Additional challenges remain that have not been satisfactorily addressed to date. Some of these challenges relate to incorporation of functional properties into lenses made of polycarbonate. Functional properties include features, such a) as light or other radiation filtering, and b) cosmetic and durability features, which may be incorporated into an optical lens to impart or modify lens characteristics, other than optical power or magnification characteristics. Some examples of functional properties include light polarization, photochromism, tint, color, decor, indicia, hardness, and abrasion resistance.

There are various examples of shortcomings relating to polycarbonate ophthalmic lenses and to techniques for manufacturing polycarbonate ophthalmic lenses. For example, no method presently exists for making polarized polycarbonate lenses capable of meeting ophthalmic prescription specifications—that is, creating polarized polycarbonate lenses with different focal powers. Also, no method presently exists for quickly and efficiently making high quality photochromic polycarbonate lenses. Furthermore, no method is available for efficiently and effectively incorporating functional properties into ophthalmic lenses made of new materials or materials that have not yet been adapted to ophthalmic lens manufacture.

Numerous methods for incorporating polarizing properties into lenses made of material other than thermoplastic material are known. For example, U.S. Pat. No. 3,051,054 to Crandon describes a method of providing a glass lens with a film of light-polarizing material. Also, U.S. Pat. No. 4,495,015 to Petcen describes a method of laminating a thermoset/thermoplastic wafer to an ophthalmic glass lens.

Various patents disclose methods of incorporating a polarizing film or wafer within a lens cast of thermoset material. For example, U.S. Pat. No. 3,786,119 to Ortlieb discloses a laminated plate of polarizing plastic material that is formed into a polarizing screen. The polarizing screen is placed within a mold which is filled with polymerizable or polycondensible liquid resin. U.S. Pat. No. 3,846,013 discloses a light-polarizing element formed by sandwiching light-polarizing material between thin layers of optical quality transparent polymeric material. The light-polarizing element is placed within a mold, and a polymerizable monomer is placed in the mold on either side of the light-polarizing element.

U.S. Pat. No. 3,940,304 to Schuler discloses a shaped light-polarizing synthetic plastic member that is disposed between layers of an optical quality synthetic monomeric material in a mold. A monomeric material is placed within the mold and polymerized to form a composite synthetic plastic light-polarizing lens structure. U.S. Pat. No. 4,873,029 to Blum discloses a plastic wafer that may include polarizing features. The plastic wafer is inserted into a mold between liquid monomer molding material. The mold is then subjected to oven-curing to polymerize the liquid monomer. Additionally, U.S. Pat. No. 5,286,419 to van Ligten et al. discloses a shaped polarizing film that is embedded in pre-gelled resin. The resin is cured to form a light polarizing lens.

However, despite the availability of these methods for incorporating a polarizing film or wafer within a lens cast of thermoset material, a need remains for an improved polarizing lens. For example, delamination of cast polarizing lenses remains a significant problem. Also, cast lenses are relatively heavy and offer less than adequate levels of impact and shatter resistance. Finally, manufactures continue to encounter difficulties making polarizing cast lenses with optimum refractive index values.

Another reference, U.S. Pat. No. 5,051,309 to Kawaki et al., concerns a polarizing plate that is made by laminating polycarbonate film on both sides of a polarizing thin layer. The polarizing thin layer is composed of a polymeric film and a dichroic dye oriented on the polymeric film. According to the patent, suitable uses of the polarizing plate include goggles and sunglasses. However, the polarizing plate of U.S. Pat. No. 5,051,309 would not be suitable for use as an optical lens capable of meeting ophthalmic prescription specifications. For example, the polycarbonate film included in the polarizing plate of this patent lacks the material integrity needed for successful grinding and polishing of polycarbonate optical elements to prescription specifications. Polycarbonate that is ground and polished to make optical elements must have sufficient material integrity to withstand the heat and pressure generated during grinding and polishing operations. The lack of material integrity of the polycarbonate film used in the Kawaki polarizing plate would affect cosmetic properties, as well as, the impact strength of any prescription specification optical elements made by grinding and polishing the polycarbonate film.

As noted, another challenge concerns incorporation of photochromic properties into polycarbonate lenses. For example, present polycarbonate lenses that include photochromic material offer marginal, and even unacceptable, photochromic properties and cosmetic qualities. Indeed, no method presently exists for making high quality photochromic polycarbonate lenses.

Two current methods of incorporating organic photochromic dyes into thermoplastic materials, such as polycarbonate, involve either inclusion of organic photochromic dye throughout the thermoplastic material or imbibition of photochromic dye into a surface of the thermoplastic material. Existing techniques, such as injection molding, for including organic photochromic dyes throughout thermoplastic materials, such as polycarbonate, typically do not yield satisfactory results. It is believed that the unsatisfactory results occur for several reasons, including the relatively high temperatures required for satisfactory injection molding and including the relatively high glass transition temperatures of many thermoplastics, such as polycarbonate.

For example, naphthopyrans, spironaphthopyrans, and spiro-oxazines that are co-melted with thermoplastics typically break down when exposed to the relatively high temperatures present during injection molding. This has been found to be especially true when the thermoplastic material is polycarbonate resin. As another example, polycarbonate, has a stiff molecular structure that is reflected by the relatively high glass transition temperature of polycarbonate. Therefore, even in the absence of photochromic compound break down, the stiff molecular structure of polycarbonate would be expected to substantially inhibit full activation of the photochromic dye, since the photochromic dye must go through a geometric transformation in the polycarbonate to activate.

The present inventors conducted an experiment to examine these photochromic compound break down and activation inhibition phenomena. The experiment involved co-melting mixing equal concentrations of an organic photochromic dye into polycarbonate resin and into cellulose acetate butyrate resin. Then, a sheet of the polycarbonate/photochromic dye mixture and a sheet of the cellulose acetate butyrate/photochromic dye mixture were cast. It was observed that the photochromic activity of the photochromic dye in the polycarbonate was approximately one half that of the photochromic activity of the photochromic dye in the cellulose acetate butyrate, under the same conditions of ultraviolet light exposure.

Imbibition of photochromic dyes into surfaces of thermoplastic materials, such as polycarbonate, also yields unsatisfactory results, which are again believed related, at least in part, to the relatively high glass transition temperatures of many thermoplastics, such as polycarbonate. For example, polycarbonate has a stiff molecular structure, as reflected by the relatively high glass transition temperature of polycarbonate. Poor photochromic dye imbibition results obtained with polycarbonate are believed related to the stiff molecular structure of polycarbonate. More specifically, it is thought that the stiff molecular structure substantially prevents the photochromic dye from penetrating into the polycarbonate.

Modification of the surface structure of polycarbonate by treatment with a solvent is said to improve imbibition of photochromic compounds into polycarbonate. In particular, U.S. Pat. No. 5,268,231 to Knapp-Hayes discloses that cyclohexanone is one of the more effective solvents for modifying the polycarbonate surface structure to accept photochromic compounds. However, the present inventors have completed experiments following the methods described in U.S. Pat. No. 5,268,231 and have found that this method leaves the surface of the polycarbonate with a rough, orange-peel type texture that is unacceptable for ophthalmic lenses. For example, the rough texture of the treated polycarbonate causes irregular and unpredictable optical effects in the treated polycarbonate.

U.S. Pat. No. 5,531,940 describes a photochromic lens and a method for manufacturing a photochromic lens comprising four alternative methods. In a first method, an uncured resin is positioned between a mold surface and a preformed lens. The resin is cured to the shape of the lens and the composite lens is impregnated with photochromic material. In a second method, an uncured resin containing a photochromically active ingredient is positioned between the lens and the mold, and the resin cured to bond it to the lens. In a third process, an uncured resin containing photochromic ingredients is positioned against the mold surface and partially cured to a gel to form a coated mold. Then a second uncured resin and then a lens preform are positioned over the gel layer in the mold. A cure step is performed top secure all of the layers together. In a fourth process, a second uncured resin is disposed between a convex surface of the lens preform and the molding surface of the mold. The second uncured resin is cured to a gel state on the mold to form a covered mold. Then the first uncured resin is positioned adjacent the gel and then the lens preform positioned over the first uncured resin. A final cure step is then provided. In all embodiments, a mold must be available that is approximately specific to the curvature of the face of the lens facing that mold surface, so that the cast and cured resin layer is of uniform thickness and conforms to the same curvature of both the mold and the convex surface of the lens.

SUMMARY OF THE INVENTION

The present invention includes a method of making an optical element that includes a thermoplastic power portion. The method includes laminating a first thermoplastic sheet to one side of a functional film, laminating a second thermoplastic sheet to a second side of the functional film, and affixing either the first thermoplastic sheet or the second thermoplastic sheet to the power portion, with the other of the first or second thermoplastic sheets being open to atmosphere. The present invention further includes a laminate for an optical element, a method of making an optical element, a method of forming an optical element, a method of making a multi-focal lens, a method of incorporating a desired property in an optical element, and a method of combining a power portion of an optical element and a functional portion of the optical element.

DETAILED DESCRIPTION OF THE INVENTION

An ophthalmic element comprises an injection molded, polymeric ophthalmic lens having a concave surface and a convex surface, and a laminate bonded to the injection molded, polymeric ophthalmic lens, the laminate comprising, in the following order: a) a first resinous layer, b) a functional layer selected from the group consisting of a light polarizing layer and a photochromic layer, and c) a second resinous layer, the first resinous layer being bonded to the convex surface of the injection molded, polymeric ophthalmic lens. The polymeric ophthalmic lens preferably comprises a polycarbonate resin. The first resin layer preferably is directly bonded to the polymeric ophthalmic lens. As an alternative structure; the first resinous layer may be adhesively bonded to the polymeric ophthalmic lens or may be fused to the polymeric ophthalmic lens. The functional layer preferably comprises a light polarizing layer or a photochromic layer. The ophthalmic element may be an injection molded, polymeric ophthalmic lens with no ophthalmic prescription power.

Figure 1:
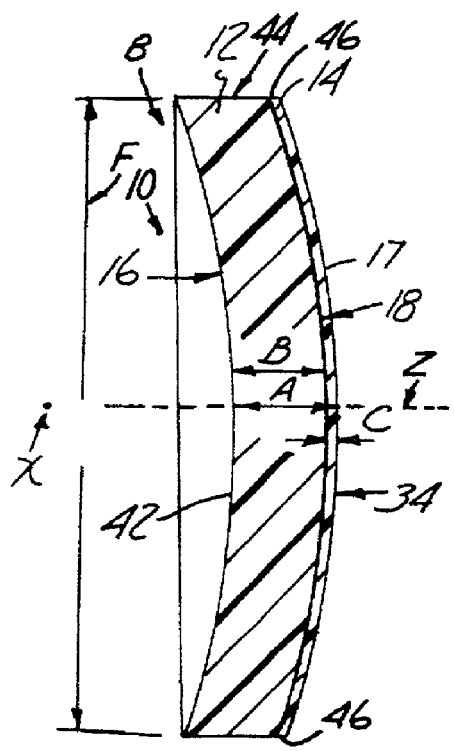
FIG. 1 is a sectional view of one embodiment of the optical element of the present invention.

An article of the present invention is generally indicated at 8 in FIG. 1. The article 8, which may take the form of an optical element such as an optical lens 10, includes a primary part, such as a power portion 12 and a secondary part, such as a functional portion 14. The functional portion 14 and the power portion 12 are attached together. The functional portion 14 and the power portion 12 are preferably integrally connected to each other and, more preferably, are fused together.

Figure 3:
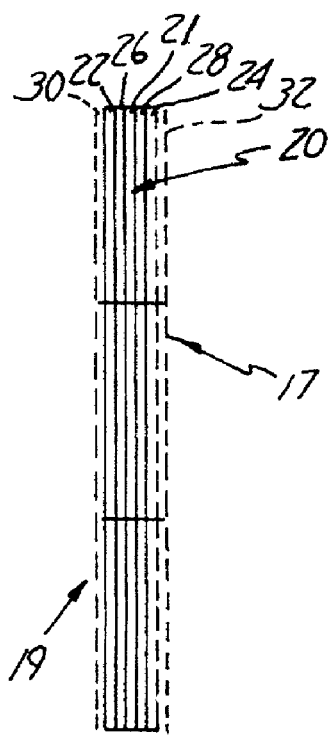
FIG. 3 is a schematic view of the functional portion of the present invention.

No method previously existed for making polarized, prescription-specification, polycarbonate lenses. The present invention solves this difficult challenge. For example, the functional portion 14 of the present invention provides a convenient and systematic way of combining a polarizing element with a polycarbonate lens, while retaining the ability to machine the polycarbonate lens to prescription specifications. As best depicted in FIG. 3, the functional portion 14 may include a functional member 20, such as a functional coating (not shown) or a functional film 21, that is attached to a first sheet 22. Optionally, the functional portion 14 may include a second sheet 24 such that the functional member 20 is sandwiched between the first sheet 22 and the second sheet 24.

Though not depicted in FIG. 3, those skilled in the art will recognize that the functional member 20 may be structured in a variety of ways, such as in composite or multi-layer fashion, in addition to the functional film 21. For example, the functional member 20 could be structured to include film portions (not shown) that entrap and protect an operative substance, such as inorganic photochromic crystals. As another example, the functional member 20 could include multiple functional film portions (not shown) that are laminated together using a conventional technique.

A functional element, such as a polarizing element (not shown), may be incorporated into the functional member 20, such as the functional film 21. The functional portion 14 that includes the polarizing element may then be included in a mold, such as an injection mold, so that the film 21 with the polarizing element is integrally molded as part of the lens 10. Alternatively, a different functional element, such as a photochromic, abrasion resistant, or tinting element, may be incorporated into the functional member 20, such as the film 21, and integrally molded as part of the lens 10. The functional elements may be made by many convenient manufacturing processes, including but not limited to lamination of the layers, adhesive securement of the individual layers, and extrusion of one or more layers (or all three layers) to form the three layer element (referred to as a laminate, but available for manufacture, as noted above, by processes in addition to lamination). A preferred method of making the functional element is to extrude layers in sequence or at the same time in the appropriate order of layers. The center layer of the three layers should be the layer with the functional capability so that a layer furthest from the ophthalmic element acts as a scratch resistant or protective layer, and the layer closest to the ophthalmic element acts as a cushion or tying layer to the ophthalmic element. It is structurally possible to use a two layer laminate (with the topmost protective resin layer and the ophthalmic, element) by using a dry film adhesive or liquid adhesive between the ophthalmic element and the functional layer, but this is a much less preferred method of manufacture.

The functional portion 14 may incorporate one or more functional properties. Essentially, the functional portion 14 operates to put incorporated functional properties, in working relation with the power portion 12. Examples of some functional properties of interest include filtering features, such as light polarization and photochromism. Additional examples of functional properties of interest include cosmetic properties, such as lens decor, indicia, tint and color. Still further examples of functional properties include durability features, such as hardness, abrasion resistance, and chemical resistance. Preferably, the functional portion 14 includes a light polarizing component or a photochromic component that functions as a filtering portion of the lens 10. Alternatively, or in addition, portions of the functional portion 14 may be tinted to function as a cosmetic portion of the lens 10.

The power portion 12 of the lens 10 may be contoured during initial formation to have an optical magnification characteristic that modifies the focal power of the lens 10. Alternatively, the power portion 12 may be machined after initial formation to modify the focal power of the lens 10. The power portion 12 provides a substantial amount of the optical power and magnification characteristics to the lens 10. The functional portion 14 inherently affects the optical power and magnification characteristics of the lens 10 since the functional portion 14 contributes to the overall thickness of the lens 10. Preferably, however, the power portion 12 provides the majority of the lens 10 optical power and magnification characteristics. Apportioning the majority of optical power and magnification to the power portion 12 permits selection of power portion 12 material and power portion 12 formation techniques that are optimum for superior lens 10 optical power and magnification characteristics, without adversely affecting selection of optimum functional portion 14 materials and formation techniques.

The power portion 12 of the lens 10 has both a rear surface 16 and a front surface 18. The functional portion 14 of the lens 10 may be coextensive with the front surface 18 of the power portion 12, as in FIG. 1. Alternatively, the functional portion 14 may overlap only a portion of the front surface 18 of the power portion 12, as in FIG. 2. Although FIGS. 1, 2, and 4 indicate definite lines of demarcation between the power portion 12 and the functional portion 14, such definite lines do not necessarily exist when the power portion 12 and the functional portion 14 are integrally connected. Rather, because of intermolecular bonding, the demarcation line between the power portion 12 and the functional portion 14 may be somewhat blurred when the power portion 12 and the functional portion 14 are integrally connected.

The functional portion 14 may take the form of a plate 17, as in FIG. 3, that is separated from a functional laminate 19. The functional laminate 19 includes the functional member 20, such as the functional film 21. The functional film 21 may include a base film (not shown) and a functional medium (not shown) that is incorporated into or onto the base film. When the functional member 20 is other than the functional film 21, the functional member 20 may include more than one base film (not shown). Alternatively, the functional film 21 may include the functional medium (not shown) and a base resin (not shown), with the functional medium and the base resin being homogeneously blended together prior to formation of functional film 21 from the medium/resin mixture. Besides the functional member 20, the functional laminate 19 includes the first sheet 22 and, optionally, includes the second sheet 24. If the second sheet 24 is included, the first and second sheets 22, 24 are located on opposing sides of the functional member 20.

The first sheet 22 may be attached to the functional member 20, such as the functional film 21, by first adhesive 26, and the second sheet 24, if included, may be attached to the functional member 20 by second adhesive 28. The first adhesive is typically not included when the functional member 20 is the functional coating (not shown). A first coating 30 may optionally be applied onto the first sheet 22 and a second coating 32 may optionally be applied onto the second sheet 24, if the second sheet 24 is included. The second sheet 24 and the first and second coatings 30 and 32 are depicted with dashed lines to illustrate the optional nature of the second sheet 24 and the coatings 30, 32.

Alternatively, the functional portion 14 may consist of a functional wafer (not shown) that includes the first sheet 22. In the functional wafer, the functional member 20, and thus the functional film 21, may consist of either the second sheet 24, the second coating 32, or the second sheet 24 that is coated with the second coating 32. If the functional wafer includes the second sheet 24, the functional wafer may optionally also include either the first adhesive 26 or the second adhesive 28 to attach the second sheet 24 to the first sheet 22. Also, the first sheet 22 may optionally include the first coating 30.

The functional portion 14 may be attached to the power portion 12 with either the first sheet 22, the second sheet 24, the first coating 30, or the second coating 32 in contact with the power portion 12. Preferably, the functional portion 14 is attached to the power portion 12 with either the first sheet 22 or the second sheet 24 in contact (not shown) with the power portion 12, since the first and second coatings 30, 32 tend to degrade adhesion of the functional portion 14 to the power portion 12.

When the first sheet 22 or the first coating 30 is in contact with the power portion 12, the second sheet 24, if included, may form an outside surface 34 of the lens 10 that is open to atmosphere and that protects the functional member 20 from marring and abrasion. The second coating 32, if included, may substitute for the second sheet 24 as the outside surface 34. Alternatively, when the second sheet 24 or the second coating 32 is in contact with the power portion 12, the second sheet 24, if included, may form the outside surface 34 of the lens 10 that is open to atmosphere and that protects the functional member 20 from marring and abrasion. Also, the first coating 30, if included, may substitute for the first sheet 22 as the outside surface 34. Furthermore, when the functional portion 14 takes the form of the functional wafer (not shown), the second sheet 24 or the second coating 32 may form the protective outside surface 34.

The lens 10 may alternatively be characterized as having a front section (not shown), a functional section (not shown), and a rear section (not shown). In this characterization, the front section and the rear section are located on opposite sides of the functional section. Additionally, the functional member 20 may serve as the functional section and the power portion 12 may serve as the rear section. Additionally, either the first sheet 22 or the second sheet 24, if included, may serve as the front section.

The functional member 20, as indicated, preferably includes either the light polarizing property or the photochromic property. When the functional member 20 includes the light polarizing property, the base film or resin is preferably of the polyvinyl alcohol-type, as described in U.S. Pat. No. 5,051,309 to Kawaki, which is hereby incorporated by reference. Specific examples of suitable resins of either the base film or the base resin include polyvinyl alcohol, polyvinyl, formal, polyvinyl acetal, and saponified (ethylene/vinyl acetate) copolymer film, with polyvinyl alcohol being especially preferred.

When the functional member 20 includes the photochromic property, the base film or base resin may include homo and copolymers of various materials, such as cellulose acetate butyrate, poly(n-butyl methacrylate), poly(isobutyl methacrylate), poly(methyl methacrylate), poly(ethyl methacrylate), polyethylene, polypropylene, poly(acrylonitrile), poly(vinyl acetate), poly(vinyl chloride), poly(butadiene), and polyamide, that are formed from appropriate monomers and pre-polymers using, conventional polymerization technology. Cellulose acetate butyrate is the preferred material for the base film or base resin since cellulose acetate butyrate readily incorporates photochromic dyes and since photochromic dyes activate and perform well in cellulose acetate butyrate.

Examples of suitable dichroic substances, such as dichroic dyes, for imparting the light polarizing property to the base film or resin are listed in U.S. Pat. No. 5,051,309 to Kawaki et al. Some examples of suitable dichroic substances include Chlorantine Fast Red (C.I. 28160), Chrysophenine (C.I. 24895), Sirius Yellow (C.I. 29000), Benzopurpurine (C.I. 23500), Direct Fast Red (C.I. 23630), Brilliant Blue 6B (C.I. 24410), Chlorazol Black BH (C.I. 22590), Direct Blue 2B (C.I. 22610), Direct Sky Blue (C.I. 24400), Diamine Green (C.I. 30295), Congo Red (C.I. 22120), and Acid Black (C.I. 20470). It is to be understood that the dichroic substance incorporated in the base film or resin may be either a single dichroic substance or a mixture that includes two or more of the dichroic substances.

The functional member 20 may incorporate any organic or inorganic photochromic substance or compound, such as photochromic substances or compounds that are compatible with the base film or resin and that are capable of imparting photochromic properties to the base film or resin. Also, the photochromic substances or compounds incorporated in the functional member 20 may be a mixture that includes two or more different dichroic substances or compounds. Examples of organic photochromic compounds suitable for imparting photochromic properties to the functional member 20, such as the base film or resin, include naphthopyrans, spironaphthopyrans, fulgides, fulgimides, salicylates, triazoles, oxazoles, and azobenzenes. Silver halide is one example of an inorganic photochromic compound that is suitable for imparting photochromic properties to the functional member 20, such as the base film or resin.

The functional portion 14 substantially prevents the structure of the dichroic substance(s) or the photochromic compound(s) from being altered due to placement of the dichroic substance(s) or the photochromic compound(s) in working relation with the power portion 12. Preferably, the functional portion 14 prevents alteration of the structure of dichroic substance(s) and photochromic compound(s) due to placement of the dichroic substance(s) or the photochromic compound(s) in working relation with the power portion 12. Additionally, the functional portion 14 substantially prevents the light polarizing activity of the dichroic substance(s) and the photochromic activity of the photochromic compound(s) from being altered due to placement of the dichroic substance(s) or the photochromic compound(s) in working relation with the power portion 12. Preferably, the functional portion 14 prevents alteration of the light polarizing activity of the dichroic substance(s) and prevents any significant alteration of the photochromic activity of the photochromic compound(s) due to placement of the dichroic substance(s) or the photochromic compound(s) in working relation with the power portion 12.

Examples of naphthopyran compounds suitable for imparting photochromic properties to the functional member 20, such as the base film or resin, include novel naphthopyran compounds that may be represented by graphic formula I as follows:

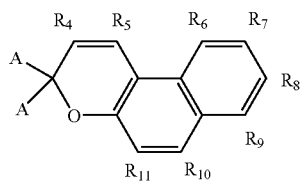

I

For purposes of the present application, including the description and the claims, it is to be understood that graphical formula I includes all structural isomers of the compounds represented by graphical formula I.

A variety of substituents may be placed on the pyran portion and the naphtho portion of the naphthopyran rings. For example, the positions represented in graphic formula I by $R_4$, $R_5$, $R_6$, $R_7$, $R_8$, $R_9$, $R_{10}$, and $R_{11}$, respectively, may be filled with hydrogen; a stable organic radical, such as alkyl, alkoxy, unsubstituted or substituted phenyl, naphthyl, cycloalkyl, furyl, alkoyl, alkoyloxy, aroyl, aroyloxy; a heterocyclic group; halogen; a nitrogen-substituted group, such as amino or nitro; or a nitrogen-substituted ring compound, such as morpholino, piperidino, or piperazino.

Also in graphic formula I, A is hydrogen, a substituted phenyl group, or a substituted naphthyl group, and B is hydrogen, a substituted phenyl group, or a substituted naphthyl group, provided that at least one of A and B is substituted phenyl or substituted naphthyl. The substituents of any phenyl or naphthyl group or groups at A or B are selected from the following: a stable organic radical, such as alkyl, alkoxy, unsubstituted or substituted phenyl, naphthyl, cycloalkyl, furyl, alkoyl, alkoyloxy, aroyl, aroyloxy; a heterocyclic group; halogen; a nitrogen-substituted group, such as amino or nitro; and a nitrogen-substituted ring compound, such as morpholino, piperidino, or piperazino; provided that at least one substituent of at least one substituted phenyl or substituted naphthyl at either A or B is phenyl, naphthyl or furyl.

Preferred naphthopyran compounds for imparting photochromic properties to the functional member 20, such as the base film or resin, include 3-(4-biphenylyl)-3-phenyl-8-methoxy-3H-naphtho [2,1b]pyran, 3-(4-biphenylyl)-3-phenyl-3H-naphtho[2,1b]pyran, and 3,3-di(4-biphenylyl)-8-methoxy-3H-naphtho-[2,1b]pyran.

Additional details about preparation and use of the novel naphthopyran compounds represented by graphic formula I, including the preferred naphthopyran compounds, may be obtained from U.S. patent application Ser. No. 08/282,278 entitled "Photochromic Naphthopyran Compounds" and filed on Jul. 28, 1994 in the name of Frank J. Hughes et al. as Applicants, which is hereby incorporated by reference.

Examples of spironaphthopyran compounds suitable for imparting photochromic properties to the functional member 20, such as the base film or resin, include novel spironaphthopyran compounds that may be represented by graphic formula II as follows:

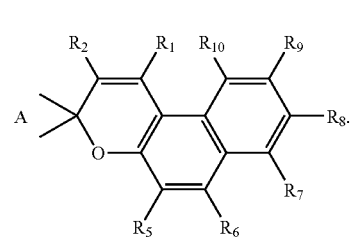

II

For purposes of the present application, including the description and the claims, it is to be understood that graphical formula II includes all structural isomers of the compounds represented by graphical formula II.

A variety of substituents may be placed on the pyran and the naphtho portion of the spironaphthopyrans of the present invention. For example, the positions represented in graphic formula II by $R_1$, $R_2$, $R_5$, $R_6$, $R_7$, $R_8$, $R_9$, and $R_{10}$, respectively, may be filled with hydrogen; a stable organic radical, such as alkyl, alkoxy, phenyl, naphthyl, cycloalkyl, furyl, alkoyl, alkoyloxy, aroyl, aroyloxy; a heterocyclic group; a halogen; a nitrogen-substituted group, such as amino or nitro; or a nitrogen-substituted ring compound, such as morpholino, piperidino, or piperazino.

Also in graphic formula II, the position represented by A is filled by a substituted divalent aromatic radical. The substituents of the divalent aromatic radical may be hydrogen or a stable organic radical such as alkyl, alkoxy, phenyl, naphthyl, cycloalkyl, furl, alkoyl, alkoyloxy, aroyl, or aroyloxy. Additionally, the substituents of the substituted divalent may also be substituted with alkyl, alkoxy, phenyl, naphthyl, cycloalkyl, furyl, alkoyl, alkoyloxy, aroyl, or aroyloxy.

Preferred spironaphthopyran compounds for imparting photochromic properties to the functional member 20, such as the base film or resin, include 8-methoxyspiro(3H-naphtho[2,1-b]pyran-3,9'-fluorene), spiro(3H-naphtho[2,1-b]pyran-3,9'-fluorene), 8-methoxyspiro(3H-naphtho[2,1-b]pyran-3,1'-tetralone), 6',7'-dimethoxy-8-methoxyspiro(3H-naphtho[2,1-b]pyran-3,1'-tetralone), 7'-methoxy-8-methoxyspiro(3H-naphtho[2,1-b]pyran-3,1'-tetralone), 2',3'-diphenyl-8-methoxyspiro(3H-naphtho[2,1-b]pyran-3,1'-tetralone), 2'-methyl-8-methoxyspiro(3H-naphtho[2,1-b]pyran-3,1'-tetralone), 2'-methyl-8-methoxyspiro(3H-naphtho[2,1-b]pyran-3,1'-indan), 2',3'-diphenyl-8-methoxyspiro(3H-naphtho[2,1-b]pyran-3,1'-indene), 2',3'-diphenyl-8-methoxyspiro(3H-naphtho[2,1-b]pyran-3,1'-tetralone), 2'methyl-8-methoxyspiro(3H-naphtho[2,1-b]pyran-3,1'-tetralone), 2'-methyl-8-methoxyspiro(3H-naphtho [2,1-b]pyran-3,1'-indan), and 2',3'-diphenyl-8-methoxyspiro(3H-naphtho[2,1-b]pyran-3,1'-indene).

Additional details about preparation and use of the novel naphthopyran compounds represented by graphic formula II, including the preferred naphthopyran compounds, may be obtained from U.S. patent application Ser. No. 08/331,281 entitled "Photochromic Spironaphthopyran Compounds" and filed on Oct. 28, 1994 in the name of Frank J. Hughes et al. as Applicants, which is hereby incorporated by reference.

The first sheet 22 and the second sheet 24 should be compatible with the power portion 12, the functional member 20, the first and second adhesives 26, 28, and, if included, the first and second coatings 30,32. In this context, compatibility means that the first sheet 22 or the second sheet 24, as appropriate, is capable of either strongly adhering to or strongly fusing with the material of the power portion 12. Additionally, compatibility means that the material of the first sheet 22 and of the second sheet 24 is incapable of undesirably reacting with other lens 10 components to degrade the power portion 12, the functional member 20, the first adhesive 22, the second adhesive 24, the first coating 30 (if included), the second coating 32 (if included), or functional media, such as photochromic or polarizing compounds incorporated in the functional member 20.

Furthermore, the power portion 12 and the one of the first sheet 22 and the second sheet 24 that is attached to the power portion 12 may generally be made of any resinous material. Thus, the first sheet 22 and the second sheet 24 may each be made of different materials, such as different thermoplastic resins. Additionally, either or both of the sheets 22, 24 may be made of a different material than the power portion 12 is made of. Preferably, the power portion 12 and the one of the first sheet 22 and the second sheet 24 that is attached to the power portion 12 are each made of any of a variety thermoplastic resins, including homopolymers and copolymers of polycarbonate, amorphous polyolefin, polystyrene, and acrylic compounds, so long as the aforementioned material compatibility requirement is met, to permit fusion of the power portion 12 to the first sheet 22 or second sheet 24. More preferably, the power portion 12 and the one of the first sheet 22 and the second sheet 24 that is attached to the power portion 12 are each made of the same thermoplastic resin to further enhance fusion of the power portion 12 to the first sheet 22 or second sheet 24.

Materials suitable for use as the first adhesive 26 and the second adhesive 28 must have good optical properties, including high optical transparencies, no yellowing upon exposure to sunlight, an ability to flex during injection molding without becoming crazed, minimal shrinkage during curing, and must meet the aforementioned material compatibility requirement. Some examples of suitable materials for the first adhesive 26 and the second adhesive 28 include acrylic-type, epoxy-type and urethane-type adhesives, such as Loctite® FMD-207, Loctite® FMD-338, Loctite® FMD-436, and Loctite® 3311, each available from Loctite Corporation of Hartford, Conn.; Norland Optical Adhesive Type 68 available from Norland Products Inc. of New Brunswick, N.J.; and Summers Laboratories Type SK-9 available from Summers Laboratories, Inc. of Collegeville, Pa. The materials used for the first adhesive 26 and the second adhesive 28 may be curable by thermal treatment or by treatment with ultraviolet light.

The first coating 30 and the second coating 32 may be formed of any material(s) suitable for providing hardness, abrasion resistance, and/or chemical resistance to the functional portion 14, so long as the aforementioned material compatibility requirement is met. Some examples of suitable coating materials include hard acrylic coatings and hard polysiloxane compounds. Preferably, the one of the sheets 22, 24 that is in contact with the power portion 12 does not include the respective coating 30, 32, since it has been found that coating of the one of the sheets 22, 24 that is in contact with the power portion 12 tends to decrease bonding of the functional portion 14 to the power portion 12.

One benefit of the lens 10 of the present invention is that an overall center thickness A of the lens 10, referring to FIG. 1, measured along longitudinal axis Z of the lens 10 may be minimized to decrease the weight of the lens 10. For example, in accordance with the present invention, a center thickness B of the power portion 12 preferably ranges from about 0.9 mm to about 20.0 mm and more preferably ranges from about 1.0 mm to about 9.0 mm. Similarly, though a center thickness C of the functional portion 14 may be any thickness that is adequate to obtain the desired functional effect, such as the light polarizing effect or the photochromic effect, in the lens 10, the center thickness C of the functional portion 14 preferably ranges from about 0.2 mm to about 2 mm and more preferably ranges from about 0.3 mm to about 0.7 mm. Though the center thicknesses B and C of the power portion 12 and the functional portion 14 are depicted in FIG. 1 as being offset from the axis Z of the lens, it is to be understood that the center thicknesses B and C of the power portion 12 and the functional portion 14, respectively, are each measured along the axis Z. Finally, the center thickness A of the lens 10 preferably ranges from about 1.5 mm to about 22.0 mm and more preferably ranges from about 1.6 mm to about 10.0 mm.

The preferred and more preferred ranges of thickness of the functional film 21, the first and second sheets 22, 24, the first and second adhesives 26, 28, and the first and second coatings 30, 32, if included, are presented in Table 1 below:

TABLE 1

| | PREFERRED | MORE PREFERRED |
|---|---|---|
| Functional Film 21 | from about 0.0005 mm to about 0.002 mm | from about 0.0007 mm to about 0.001 mm |
| First Sheet 22 | from about 0.2 mm to about 1.0 mm | from about 0.3 mm to about 0.35 mm |
| Second Sheet 24 (optional) | from about 0.2 mm to about 1.0 mm | from about 0.3 mm to about 0.35 mm |
| First Adhesive 26 | from about 0.0005 mm to about 0.002 mm | from about 0.0007 mm to about 0.001 mm |
| Second Adhesive 28 | from about 0.0005 mm to about 0.002 mm | from about 0.0007 mm to about 0.001 mm |
| First Coating 30 (optional) | from about 0.0003 mm to about 0.001 mm | from about 0.0004 mm to about 0.006 mm |
| Second Coating 32 (optional) | from about 0.0003 mm to about 0.001 mm | from about 0.0004 mm to about 0.006 mm |

As noted, when the functional portion 14 takes the form of the functional wafer (not shown), the functional film 21 may consist of either the second sheet 24, the second coating 32, or the second sheet 24 that is coated with the second coating 32. Thus, when the functional portion 14 takes the form of the functional wafer (not shown), it should be readily understood that consequent changes in the thickness of the functional film 21 will result.

The lens 10 may be either a single vision lens, a progressive multi-focal lens, an aspheric lens, an aspheric multi-focal lens, or a stepped multi-focal lens. Single vision lenses, which may take the form of the lens 10, have essentially the same focal power at any point on the outside surface 34 of the lens 10 when objects (not shown) located in front of the functional portion 14 of the lens 10 are viewed through the lens 10 from a select point X located behind the lens 10 and on the axis Z. The outside surface 34 should be substantially smooth, and is preferably very smooth, to help minimize generation of any irregular, unpredictable optical effects in the lens 10.

For the progressive multi-focal lens, which may also take the form of the lens 10, the focal power of the lens 10 changes in continuous increments when objects located in front of the outside surface 34 are viewed from the select point X through different points of the outside surface 34. For the progressive multi-focal lens, the focal power of the lens 10, when viewing objects from point X, changes in continuous increments when moving about the outside surface 34, in part due to the smooth continuous nature of the outside surface 34 of the lens 10 that is progressive multi-focal. When the lens 10 is progressive multi-focal, the front surface 18 and the outside surface 34 are aspherically shaped. Additionally, when objects are viewed from point X through the lens 10 that is progressive multi-focal, lines are not seen when moving between points about the surface 34 that have different focal powers.

Figure 4:
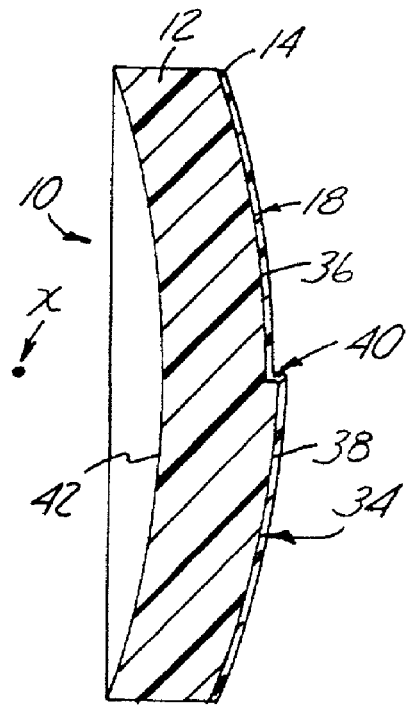
FIG. 4 is a sectional view of one embodiment of the optical element of the present invention.

When the lens 10 is a stepped multi-focal lens, such as the lens 10 depicted in FIG. 4, the front surface 18 of the power portion 12 is discontinuous. For example, the lens 10 of FIG. 4 is a stepped bi-focal lens in which the front surface 18 is divided into a main focal surface 36 and a secondary focal surface 38. The main focal surface 36 and the secondary focal surface 38 cooperate to define a stepped surface 40 that, disrupts smooth transition between the main focal surface 36 and the secondary focal surface 38. As depicted in FIG. 4, the secondary focal surface,38 may be elevated, at least in part, relative to the main focal surface 36. Alternatively, though not depicted in FIG. 4, it is to be understood that the main focal surface 36 may be elevated, at least in part, relative to the secondary focal surface 38. Furthermore, it is to be understood that when the lens 10 is stepped multi-focal, the front surface 18 may be divided into more than two discontinuous surfaces, rather than only the two discontinuous surfaces, namely the main focal surface 36 and the secondary focal surface 38, as depicted in FIG. 4.

When the lens 10 is multi-focal, the lens 10 may be either progressive multi-focal, aspheric multi-focal, or stepped multi-focal. The costs of obtaining the progressive and the aspheric multi-focal lenses are somewhat comparable to the cost of obtaining the stepped multi-focal lenses. Manufacture of stepped multi-focal lenses requires somewhat less expensive and somewhat less complicated tooling than does manufacture of progressive multi-focal lenses or manufacture of aspheric multi-focal lenses. On the other hand, actual manufacturing costs for stepped multi-focal lenses are somewhat higher that are manufacturing costs for progressive or aspheric multi-focal lenses.

Nonetheless, the lens 10 is preferably progressive multi-focal, rather than stepped multi-focal, since shaping of the functional portion 14 to match the shape of the front surface 18 of the power portion 12 is easier for the progressive multi-focal lens than for the stepped multi-focal lens. Further-more, progressive multi-focal lenses are generally perceived by consumers to be a more sophisticated and cosmetically appealing lens than stepped multi-focal lenses. Additionally, the lens 10 is preferably progressive multi-focal, rather than aspheric multi-focal, since progressive multi-focal lenses are generally perceived by consumers to be a more sophisticated and cosmetically appealing lens than aspheric multi-focal lenses.

Figure 2:
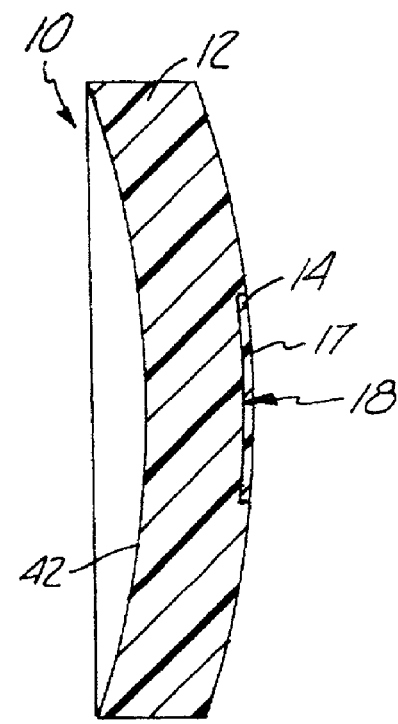
FIG. 2 is a sectional view of one embodiment of the optical element of the present invention.

The lens 10, as in FIGS. 1, 2, and 4, may be either a finished lens or a semi-finished lens. When the lens 10 is the finished lens, the focal power or focal power range of the lens is set during manufacture of the lens 10 and no further processing of the lens 10 is required to set the focal power or focal power range. When the lens 10 is semi-finished, additional processing after initial manufacture of the lens 10, such as grinding of a rear surface 42 of the lens 10, is needed to set the focal power or focal power range of the lens 10. If the lens 10 is finished, the rear surface 42 may include a coating (not shown) to enhance the hardness and abrasion resistance of the rear surface 42 of the lens. If the lens 10 is semi-finished, the coating need only be applied to the outside surface 34 of the lens 10, since the coating on the rear surface 42 of the lens 10 may be damaged or removed during further processing of the semi-finished lens. However, even if the lens 10 is semi-finished, the rear surface 42 may include the coating (not shown) to simplify or reduce the cost of manufacturing the semi-finished lens.

The method of making the lens 10 generally involves three distinct steps. First, the functional member 20, such as the functional coating (not shown) or the functional film 21, is prepared. Next, the functional portion 14 is prepared. Finally, the lens 10 is made by attaching the functional portion 14 to the power portion 12.

It is to be understood that functional properties in addition to polarization or photochromism, such as tint, color, hardness, abrasion resistance, and chemical resistance, decor, and indicia may be incorporated in the functional member 20, such as functional coating (not shown) or the functional film 21, using conventional techniques. However, the functional film 21 preferably incorporates either the light polarization property or the photochromic property. Additionally, any of the sheets 22, 24 or the coatings 30, 32 may impart durability characteristics, such as hardness, abrasion resistance, and chemical resistance, to the lens 10 and especially to the outside surface 34 of the lens.

The dichroic compound(s) may be incorporated into the base film to make the functional film 21 with the polarizing property using any suitable procedure. For example, the base film (not shown) may be immersed in an aqueous solution of dichroic substance at a temperature ranging from about 10° C. to about 50° C. to effect absorption of the dichroic substance on the base film. Next, the base film is stretched in one direction to a dimension ranging about 2½ times to about 8 times the unstretched dimension of the base film in a water solution with a temperature ranging from about 10° C. to about 80° C. The water solution should contain a dissolved additive, such as a metal ion or boric acid, to effect adsorption and orientation of the dichroic substance(s) onto the base film.

The organic photochromic compound(s) may be incorporated into the base film to make the functional film 21 having the photochromic property using any suitable procedure. As an example, in one suitable procedure useful for the preferred naphthopyrans and spironaphthopyrans the photochromic compound(s) are dissolved in a suitable solvent. Examples of suitable solvents include butyl acetate; hexane; cyclohexane; various alcohols, including ethanol and methanol; and various ketones; such as cyclohexanone and methyl ethyl ketone. Next, a photochromic compound/resin/solvent mixture is made by adding the photochromic compound/solvent solution to the molten monomer or molten pre-polymer of the homopolymer or copolymer selected for the base film. A suitable ultraviolet stabilizing compound may be incorporated into the photochromic compound /resin/solvent mixture to help stabilize the photochromic compound(s) against activation fatigue.

In a second suitable alternative for the preferred naphthopyrans and spironaphthopyrans, the photochromic compound(s) and the homopolymer or copolymer resin selected for the base film are first mixed together. The solvent is then added to the photochromic compound/resin mixture, and the photochromic compound/resin/solvent mixture is heated to melt and/or dissolve the photochromic compound(s) and resin in the solvent and homogeneously mix all components of the mixture.

The mixture of photochromic compound(s), solvent, and monomer or pre-polymer, however created, may be formed into a film or sheet by a suitable extrusion or casting method. Preferably, the mixture is cast on a flat surface using a conventional thermoset plastic casting technique. Upon evaporation of the solvent from the cast film or sheet, the functional film 21 having the photochromic property remains.

The inorganic photochromic compound(s) may be incorporated into the functional member 20, such as the functional film 21, having the photochromic property using any suitable procedure. As an example, the inorganic photochromic compound(s) may be any suitable potentially photochromic glass that is treated and ground to make photochromic glass particles in accordance with U.S. Pat. No. 4,622,184 to Barnhart et. al, which is hereby incorporated by reference. The photochromic glass particles may be blended with the base resin, as specified in U.S. Pat. No. 4,622,184, and then may be formed into the functional film 21 a conventional method, such as a suitable extrusion or casting method.

As another example, the inorganic photochromic compound(s), such as silver halide particles, may be co-deposited along with a monomer on a substrate, such as the base film, in accordance with U.S. Pat. No. 4,596,673 to Beale, which is hereby incorporated by reference. The monomer polymerizes as a result of the co-deposition to secure the silver halide to the base film. Monomers that are suitable for use in practicing the method of U.S. Pat. No. 4,596,673 include hexamethyldisiloxane, hexamethyldisilizane, vinyl trimethylsiloxane, tetramethyldisiloxane, and vinyl trimethoxysilane. The functional film 21 that incorporates the inorganic photochromic compound(s), such as the silver halide particles, remains after the monomer polymerizes.

As an additional example, the base resin may be prepared by combining (1) an unsaturated polyester resin produced by esterification of a polybasic unsaturated organic acid with a polyhydric alcohol and (2) a polar vinyl monomer of the type that forms polar solvent soluble plastic when homopolymerized, in accordance with U.S. Pat. No. 4,110,244 to Hovey, which is hereby incorporated by reference. One or more unsaturated vinyl monomers may, if desired, be blended with the unsaturated polyester resin before the polyester resin is combined with the polar vinyl monomer. The mixture of the unsaturated polyester resin, either with or without the unsaturated vinyl monomer(s), and the polar vinyl monomer may be polymerized and cast in accordance with U.S. Pat. No. 4,110,244 to form the base film. The base film is then immersed in ionic solutions in accordance with U.S. Pat. No. 4,110,244 to form the functional film 21 that incorporates the inorganic photochromic compound(s), such as silver halide.

As another example, the inorganic photochromic compound(s), such as silver halide crystals, may be coated with an inorganic material to make coated photochromic material, in accordance with U.S. Pat. No. 4,046,586 to Uhlmann et al., which is hereby incorporated by reference. The coated photochromic material may then be blended, as indicated in the Uhlmann patent, with a solution of the base resin in a suitable solvent. The functional film 21 may then be prepared by casting the mixture of the base resin, the solvent, and the coated photochromic material, using a conventional casting technique.

As yet another example, the inorganic photochromic compound(s), such as silver halide crystals, may be incorporated into a photochromic plastic material, as, explained in U.S. Pat. No. 4,049,567 to Chu et al., which is hereby incorporated by reference. The photochromic plastic material may then be sandwiched between two sheets of the base film and sealed with epoxy resin, in accordance with the Chu patent, to form the functional member 20. This is an example of how the functional member 20 may be structured other than as the functional film 21.

After the functional member 20, such as the functional film 21, is prepared, the functional portion 14 may be made by laminating the first sheet 22 and, if desired, the second sheet 24 to the functional member 20 using the first adhesive 26 and the second adhesive 28, respectively. Any conventional adhesive-based lamination technique, such as rolling to apply suitable pressure, may be relied upon to laminate the sheets 22, 24, to the functional member 20. The coating 30, if included, may be applied to the first sheet 22 either before or after lamination of the sheet 22 to the functional member 20. Similarly, if the second sheet 24 is included, the coating 32, if included, may be applied to the second sheet 24 either before or after lamination of the sheet 24 to the functional member 20. Alternatively, when the functional member 20 is the functional coating (not shown), the functional portion 14 may be prepared by applying the functional coating onto the first sheet 22 using any suitable procedure, such as spraying, brushing, or powder application. Examples of materials that are suitable for forming the functional coating include those materials that are suitable for providing functional properties, such as hardness, abrasion resistance, and/or chemical resistance, to the functional portion 14, so long as the aforementioned material compatibility requirement is met. Some examples of suitable materials for the functional coating include hard acrylic coatings and hard polysiloxane compounds.

When the functional coating (not shown) is included, the first adhesive 26 is optional since the functional coating may be applied directly onto the first sheet 22. typically provides the outside surface 34 of the lens 10. Also, the second adhesive 28, the second sheet 24, and the second coating 32 are optional when the functional member 20 is the functional coating since the functional coating may be used to form the outside surface 34 of the lens 10. Furthermore, the functional coating may be selected to provide the outside surface 34 with desirable functional properties, such as hardness, abrasion resistance, and/or chemical resistance.

In one preferred embodiment, the functional film 21 that incorporates the polarizing property is a purchased item known as POLA SHEET. POLA SHEET may be obtained by contacting Yushi Seihin Co. in Tokyo, Japan. It is believed that the functional film 21 having the photochromic property is not available as a purchased item. Therefore, it is necessary to make the functional film 21 having the photochromic property using the method of the present invention.

Alternatively, when the functional portion 14 takes the form of the functional wafer (not shown), the functional portion 14 may be prepared by laminating the second sheet 24 to the first sheet 22 using the first adhesive 26 or the second adhesive 28. Any conventional adhesive-based lamination technique may be relied upon to laminate the sheets 22, 24, together. The coatings 30, 32, if included, may be applied to the first sheet 22 and the second sheet 24, respectively, either before or after lamination of the sheets 22, 24. When the functional wafer (not shown) does not include the second sheet 24, the second coating 32 may be applied to the first sheet 22 using any conventional coating application technique.

The power portion 12 and the functional portion 14 may be combined to make. the lens 10 using any conventional technique, such as laminate bonding, injection molding, compression molding, or injection-compression molding (sometimes called "coining"). No matter the method used to join the power and functional portions 12, 14, the plate 17 must be separated from the functional laminate 19 and configured to the size and pattern the plate 17 will have when included in the lens 10. The plate 17 may be separated from the laminate 19 using any conventional technique. Other than in the Examples, all subsequent comments about plate 17 apply with equal force to the functional wafer. Some examples of potential plate 17 sizes and shapes are depicted in FIGS. 1 and 2. The plate 17 may be pre-shaped either before being incorporated into the lens 10 or, alternatively, the plate 17 may be shaped while being incorporated into the lens 10.

The plate 17 may be pre-shaped using any suitable laminate shaping process. One example of a suitable process entails heating the plate 17 to a suitable temperature. Simultaneous with or subsequent to the heating, positive pressure is applied to the plate 17 using a suitable device to shape the plate 17 and match the shape of the front surface 18 of the power portion 12. Once the plate 17 is appropriately shaped, the plate 17 is cooled to room temperature and the positive pressure is released.

Figure 5:
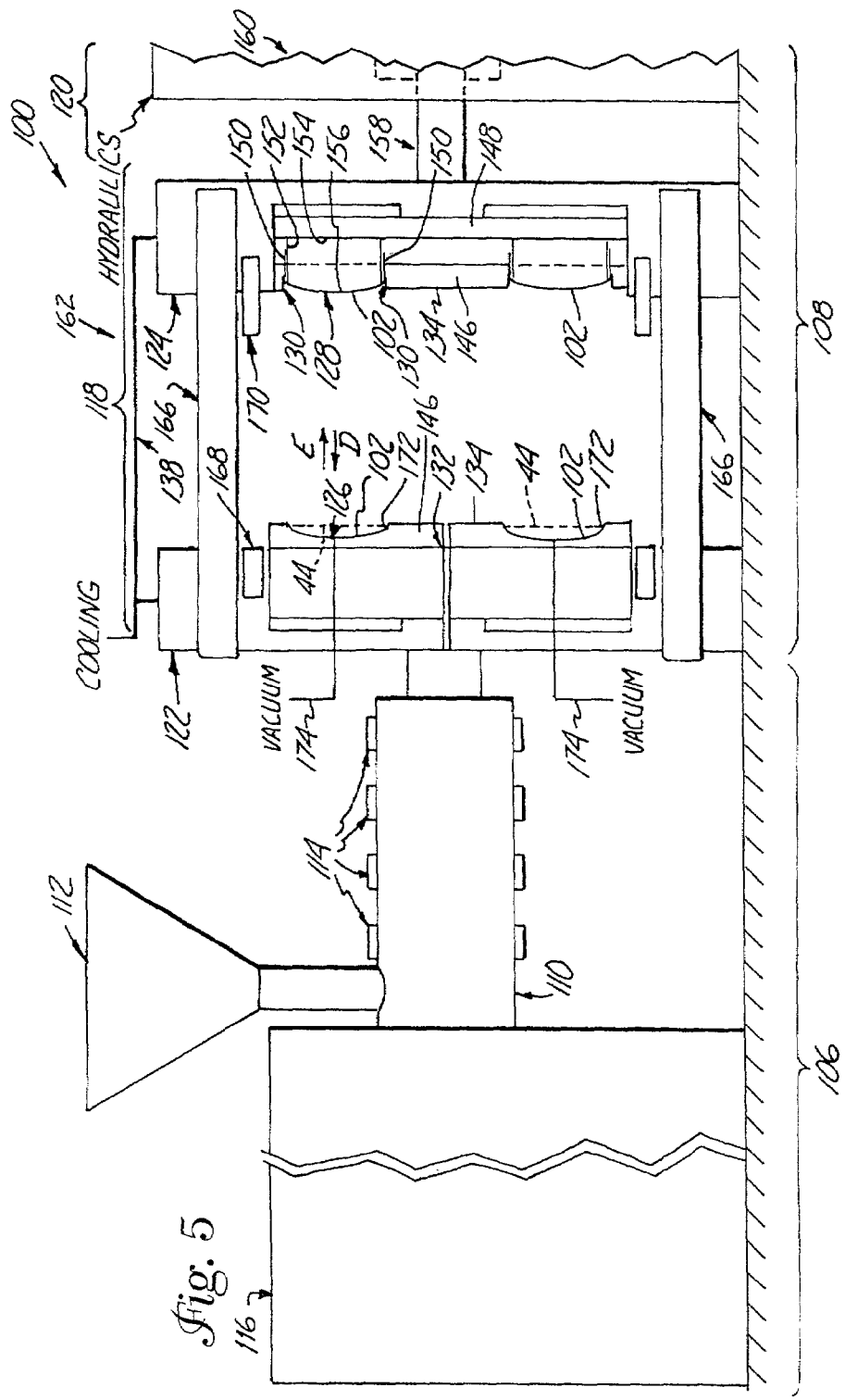
FIG. 5 is a schematic view of an injection molding machine with a mold for practicing the method of the present invention.
Figure 6:
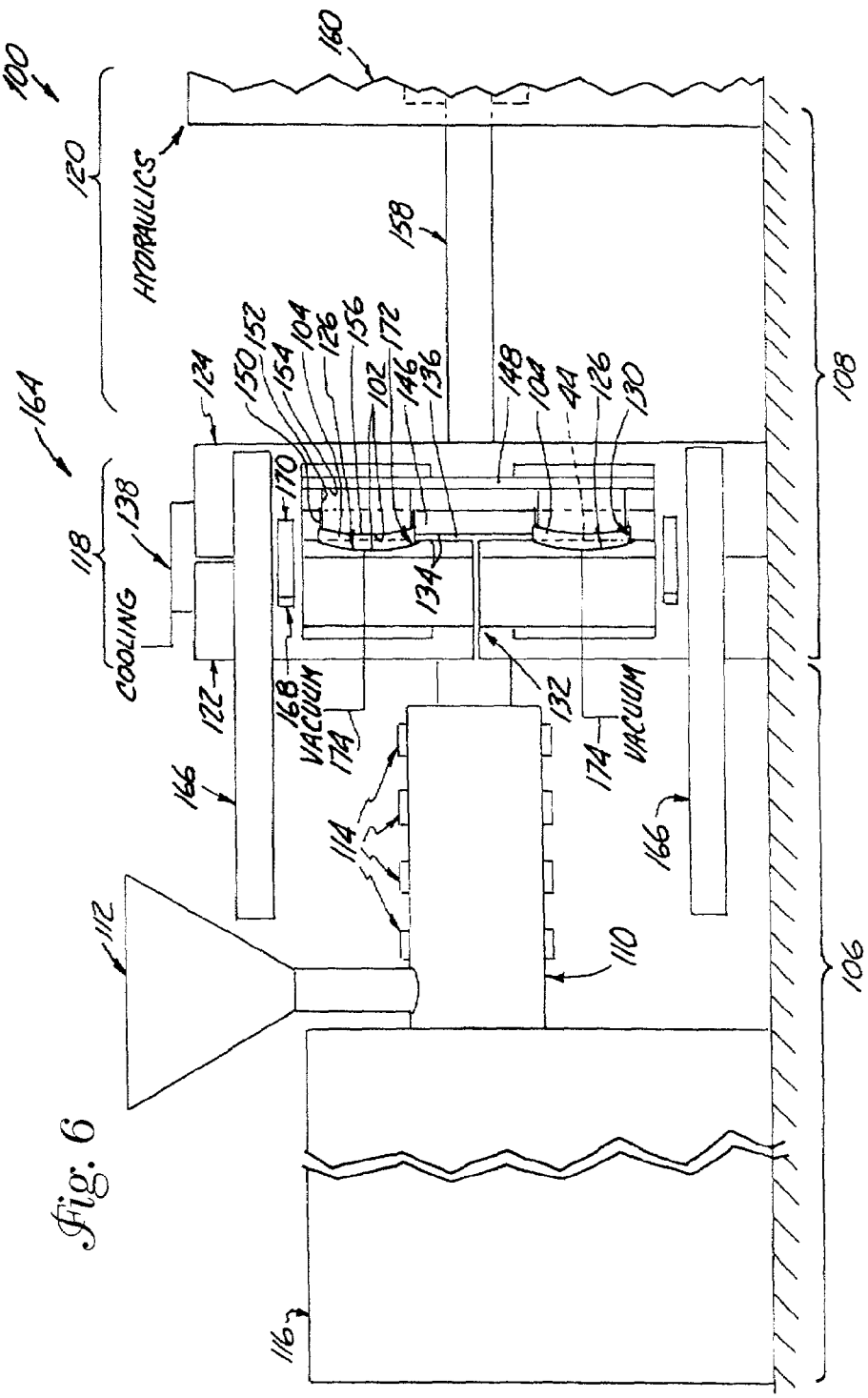
FIG. 6 is a schematic view of an injection molding machine with a mold for practicing the method of the present invention, with the mold closed to form a mold cavity.

In accordance with the method of the present invention, the power and functional portions 12, 14 may be joined to make the lens 10 using a molding machine 100, as in FIG. 5, that includes a plurality of mold surfaces 102. When the molding machine 100 is closed, as in FIG. 6, the mold surfaces 102 define a plurality of mold cavities 104. Though two mold cavities 104 are depicted in FIG. 6, it is to be understood that the molding machine 100 may include only one of the mold cavities 104 and may also include more than two of the cavities 104.

The molding machine 100 is preferably a reciprocating screw injection molding machine. The molding machine 100, referring back to FIG. 5, includes an injection portion 106 and a clamping portion 108. The injection portion 106 includes a barrel 110 that contains a reciprocating screw (not shown). The injection portion 106 also includes a hopper 112 that directs pelletized thermoplastic resin (not shown) to the screw. The injection portion 106 further includes a plurality of heater bands 114 arranged about the barrel 110 to melt the thermoplastic resin. Additionally, the injection portion 106 includes a hydraulic power unit 116 that rotates and reciprocates the screw.

The clamping portion 108 includes a mold portion 118 and a drive portion 120 that opens and closes the mold portion 118. The mold portion 118 includes a fixed mold half 122 that is in fixed association with the injection portion 106. The mold portion 118 also includes a movable mold half 124 that is in mateable association with the fixed mold half 122. Together, referring to FIG. 6, the mold halves 122, 124 cooperatively define the mold cavities 104. The mold surfaces 102 of each mold cavity 104 may be classified into three types of molding surfaces, namely, a convex surface 126, a concave surface 128, and radial surfaces 130. The convex surface 126 of the mold cavity 104 defines the outside surface 34 of the lens 10. The convex surface 126 may be configured to match any shape of the outside surface 34 of the lens 10, including the discontinuous shape, as in FIG. 4, of the outside surface 34. Similarly, the concave surface 128 of the mold cavity 104 defines the rear surface 42 of the lens 10.

The radial surfaces 130 of the mold cavity 104 define a perimeter 44 of the lens 10. The radial surfaces 130 may be entirely defined in the movable mold half 124, as depicted in FIG. 5. Alternatively, though not depicted in the Figures, the radial surfaces 130 may be entirely defined in the fixed mold half 122 or may be partially defined in the fixed mold half 122 and partially defined in the movable mold half 124.

The fixed mold half 122 has a sprue 132 that is in fluid communication with the injection unit 106. Additionally, opposing surfaces 134 of the fixed mold half 122 and the movable mold half 124 cooperatively define branches 136, as depicted in FIG. 6, which place the injection unit 106 and the sprue 132 in fluid communication with each mold cavity 104. The mold portion 118 additionally includes a plurality of cooling lines 138 oriented within the mold halves 122, 124 to cool molten thermoplastic resin after injection of the resin into the mold cavity 104 is complete.

The movable mold half 124 preferably includes a fixed mold plate 146 and a movable mold plate 148. The mold half 124 also includes a plurality of sleeves 150 that are in substantial registry with radial surfaces 130 of the mold cavities 104. The mold half 124 further includes a plurality of pistons 152 that are slideably received within the sleeves 150 and are fixedly attached to the mold plate 148 at ends 154. Ends 156 of the pistons 152 form the convex surfaces 126 of the mold cavities 104.

The drive portion 120 of the clamping unit 108 includes a hydraulic ram 158 that is in working relationship with the movable mold half 124. The drive portion 120 further includes a hydraulic power unit 160 that drives the hydraulic ram 158 and places the movable mold portion 124 either in an open condition 162, as in FIG. 5, or in a closed position 164, as in FIG. 6.

The movable plate 148, and thus the pistons 152, are in working relation with the hydraulic ram 158. Movement of the plate 148 and the pistons 152 is timed so that the pistons 152 move in the direction of arrow D, as best depicted in FIG. 5, after molding of the lenses 10 is complete and as the mold halves 122, 124 are separated, Movement of the pistons 152 in direction D ejects the lenses 10 from the mold cavities 104 by substantially even application of pressure over the rear surface 42 of each lens 10. Conversely, movement of the plate 148 and the pistons 152 is timed so that the pistons 152 move in the direction of arrow E to orient the surfaces 126, 128, 130 for molding following ejection of the lenses 10.

The clamping unit 108, as best depicted in FIG. 6, includes a plurality of tie bars 166 that help maintain the movable mold half 124 in mateable alignment with the fixed mold half 122. Also, the fixed mold half 122 includes cylindrical female guides 168, and the movable mold half 124 includes cylindrical male members 170 that slidably engage respective cylindrical female guides 168. The guides 168 and members 170 help maintain proper alignment of the fixed and movable mold halves 122, 124 relative to each other.

In one embodiment, the mold halves 122, 124 are made of a low carbon plastic mold steel, such as Series P20 stainless steel tool steel. The molding machine 100 may be any suitable injection molding machine, such as a Vista injection molding machine which is available from Cincinnati Milacron of Batavia, Ohio.

Prior to molding the lens 10 in the molding machine 100, the plate 17 that makes up the functional portion 14 is placed against a recess 172 of the mold plate 146, as best depicted in FIG. 5, before the mold halves 122, 124 are closed. The recess 172 may be defined by a notch (not shown) in the convex surface proximate the intersection of the convex surface 126 and the radial surface 130, as best depicted in FIG. 6. Alternatively, when any portion of the radial surface 130 is defined in the fixed mold half 122, the recess 172 may be defined by the intersection of the convex surface 126 and the radial surface 130. When the plate 17 has a different size or shape than the front surface 18, as in FIG. 2, the convex surface 126, as in FIG. 5, may be notched (not shown) accordingly to reposition the recess 172 elsewhere in the convex surface 126 to accommodate the different size or shape of the front surface 18.

As noted, the plate 17 may be pre-shaped to match the shape of the front surface 18 of the power portion 12. Alternatively, the molding machine 100 may be configured with a vacuum source 174 and associated vacuum lines that are in communication with the convex surface 126 of each cavity 104, as in FIG. 5. Using the vacuum source 174, each plate 17 may be placed against respective recesses 172 and pulled into communication with respective convex surfaces 126 without pre-shaping the plates 17 prior to placement in the machine 100.

No matter whether the plates 17 are pre-shaped outside the mold cavities 104 or are shaped in the mold cavities 104, each plate 17 should be placed in the respective mold cavity 104 so that a pneumatic seal (not shown), a mechanical seal (not shown), or a combination pneumatic/mechanical seal (not shown) is created between each plate 17 and the respective convex surface 126 of the mold half 122. The mechanical seal relates to the plates 17 that are pre-shaped. To obtain the mechanical seal, the plates 17 must be properly sized to take into account expansion of the metal used to make the mold halves 122, 124 so that the plates 17 remain snug and secure within the recesses 172 when molten resin is injected into the mold cavities 104. The pneumatic seal relates to the plates 17 that are shaped by the vacuum source 174 and may also relate to the plates 17 that are pre-shaped. The pneumatic seal may be created by applying sufficient vacuum to maintain the plates 17 snugly in registry against the respective convex surfaces 126 while molten resin is injected into the mold cavities 104.

Sealing between plates 17 and respective convex surfaces 126 is necessary to prevent molten thermoplastic resin that is injected into the mold cavities 104 from flowing between the plates 17 and respective convex surfaces 126. Intrusion of the molten resin between the plates 17 and the convex surfaces 126 would be expected to undesirably create one or more optical or cosmetic problems, such as delamination of the functional film from the sheet 22, 24, burning of the plate 17 or the film 21, stress. points within the plate 17, warpage of the plate 17, and flow lines on the outside surface 34 of the lens 10.

After placement of the plates 17 against the recesses 172, the molding machine 100 is closed to form the mold cavities 104, as in FIG. 6. The thermoplastic resin selected for the power portion 12 is then injected into the cavities 104 in the molten state to fill that portion (not shown) of the cavities 104 not occupied by the plates 17 and form the power portion 12 of each lens 10. Additionally, in each cavity 104, the injected resin comes into abutting contact with the plate 17 located in the cavity 104. The temperature of the injected resin causes the power portion 12 formed by the injected resin to fuse with the functional portion 14 at the one of the sheets 22, 24 that is preferably oriented against the front surface 18 of the power portion 12. The heat present in each cavity 104 is preferably sufficient to cause the power portion 12 and the functional portion 14 to fuse together by welding into a permanent bond. After the injected resin solidifies, the cavity 104 may be opened by moving the molding halves 122, 124 away from each other, as in FIG. 5. Preferably, the lens 10 is then ejected from the molding machine 100 by movement of the appropriate piston 152 in direction D.

Formation of the power portion 12 in the molding machine 100 highlights another important advantage of the present invention, namely, the equalizing effect that the power portion 12 exerts within the lens 10 upon any non-uniformities in the thickness of the functional portion 14. Though it is preferred that the functional portion 14 be substantially uniform in thickness, some variation in thickness of the functional portion 14 is permissible. Thickness variation in the functional portion 14 is permissible because mold cavity 104 is uniform in thickness. Thus, injection of resin into the mold cavity 104 compensates for any non-uniformities in thickness of the functional portion 14 by varying the thickness of the power portion 12 accordingly.

After being removed from the machine 100, each lens 10 may be coated with a suitable coating, such as an acrylic or a polysiloxane coating composition, to provide a hard surface on the lens 10. Coating may be accomplished using conventional techniques such as dipping, spraying, or spin-coating. As already noted, if lens 10 is finished after application of the coating, the coating may be applied to the outside surface 34 and the rear surface 42 of the lens 10. If the lens 10 is semi-finished, the, coating need only be applied to the outside surface 34 of the lens 10, since the coating on the rear surface 42 may be damaged or removed during further processing of the semi-finished lens. Alternatively, the coating may be applied to all surfaces of the semi-finished lens, including the outside surface 34 and the rear surface 42 to simplify or reduce the cost of manufacturing the semi-finished lens.

A number of advantages are realized when the method of the present invention is used to make the lens 10. For example, functional properties are readily incorporated into the lens 10 without altering the substantially smooth nature, and preferably the very smooth nature, of the outside surface 34. Thus, undesirable and unpredictable optical effects that would otherwise be expected to occur in the lens 10, if the outside surface 34 were other than smooth in nature, are greatly minimized or eliminated altogether when the lens 10 of the present invention is used.

Also in accordance with the present method, the lens 10 may be finished, as opposed to semi-finished, with the power portion 12 being contoured to modify the focal power of the lens 10. Alternatively, the lens 10 may be semi-finished so that the power portion is capable of being machined, at some time following manufacture, to modify the focal power of the lens 10.

Additionally, it has been discovered that the functional portion 14 substantially beneficially prevents the structural alteration of dichroic substances and photochromic compounds due to placement of the dichroic substances or the photochromic compounds in working relation with the power portion 12. Furthermore, it has been discovered that the functional portion 14 substantially prevents the alteration of the light polarizing activity of dichroic substances and alteration of the photochromic activity of photochromic compounds due to placement of the dichroic substances and the photochromic compounds, respectively, in working relation with the power portion 12.

The method of the present invention provides a systematic approach for incorporating a wide variety of functional properties into the lens 10 simply by modifying the functional portion 14. Also, the method of the present invention provides a systematic method for incorporating functional properties into optical elements, such as the lens 10, even as new materials supplant presently favored materials, such as polycarbonate, in lens 10 manufacture. When a new material is developed, the material used to make the first sheet 22 and the second sheet 24 may be modified to maintain compatibility between the new material and the materials used in the functional portion 14, including the materials of the first and second sheets 22, 24.

It should also be understood that the functional portion 14 may be attached to any surface of a new or existing lens (not shown) using any conventional technique, such as adhesive attachment or laminate bonding. In this way, functional properties may be imparted to new lenses that initially lack the properties. Also, functional properties may be imparted to existing lenses, instead of discarding the existing lenses and manufacturing new lenses that include the functional properties. Additionally, suitable solvents may be applied to remove the functional portion 14 from the existing lens (not shown) so that a different one of the functional portions may be applied to the existing lens. This option facilitates changing the functional properties of the existing lens when the need for particular functional properties changes.

The present invention is more particularly described in the following examples which are intended as illustrations only since numerous modifications and variations within the scope of the general formulation will be apparent to those skilled in the art.

EXAMPLES

Examples 1–4

Examples 1–4 demonstrates formation of the lens 10 with the polarizing property incorporated in the functional portion 14. Additionally, the lens 10 formed in Examples 1–4 each have different physical dimensions and different focal powers.

More particularly, in Examples 1–4, the functional laminate 19 included the functional film 21, the first and second sheets 22, 24, and the first and second adhesives 26, 28. The functional laminate 19 also included the second coating 32, but did not include the first coating 30. The functional laminate 19 included the light polarizing property and consisted of POLA SHEET obtained from Mitsubishi Engineering Plastics Co. The base film of the functional film 21 was made of polyvinyl alcohol, and the first and second sheets 22, 24 were made of polycarbonate. The film 21 was about 0.003 mm thick and the first and second sheets 22, 24 were each about 0.3 mm thick. The adhesives 26, 28, which were each about 0.003 mm thick, were ordinary acrylic-type, epoxy-type, or urethane-type adhesives. The coating 32, which was about 0.003 mm thick, was a hard polysiloxane coating.

For each lens 10 of examples 1–4, the plate 17 was cut from the functional laminate to make the functional portion 14. The plate 17 was generally round in shape and had substantially the same dimensions as the surface 18 of the power portion 12 to be made. The plate 17, which was not pre-shaped, was placed within the recesses 172 so that the second sheet 24 faced the convex surface 126. The plate 17 was observed to have a snug fit within the recesses 172 that was suitable for creating the mechanical seal. The vacuum source 174 was activated to 28.5 millimeters of mercury to effect the pneumatic seal and to pull the plate 17 into registry with the convex surface 126.

For examples 1–4, the mold halves 122, 124 were then closed to make the mold cavity 104 using the molding machine 100. The clamping force of the machine 100 used in these examples was 160 tons, and the resin injection velocity was 1.5 inches per second. The resin melt temperature of the machine 100 was 585° F., and the mold temperature was 265° F. Molten Lexan® polycarbonate resin was injected into the cavity 104. Lexan® polycarbonate is available from General Electric Plastics Co. of Pittsfield, Mass. After cooling, the mold halves 122, 124 were opened and the lens 10 was ejected from the mold half 122.

For the lenses 10 of Examples 1–4, it was noted that no injected polycarbonate flowed between the plate 17 and the convex surface 126. Additionally, no delamination of the functional portion 14 and no warping of the functional film 21 was observed. Furthermore, the functional portion 14 and the power portion 12 were found to be firmly attached to each other. No voids or inclusions were found anywhere in the power portion 12, including proximate the functional portion 14. After the inspection, the second sheet 24 of each lens 10 of Examples 1–4 was coated with the coating 32 using a conventional dip-coating technique.

Various tests were carried out on the lenses produced in Examples 1–4. The lenses 10 produced in Examples 1–4, referring to FIG. 1, had diameters F and center thicknesses A as indicated in Table 2 below. Additionally, the design and resultant true curves of the lenses 10 were determined to have the values listed in Table 2 using conventional optical measurement techniques.

| Example Number | Lens Diameter F (mm) | Center Thickness A (mm) | Design Curve (Diopters) | Resultant True Curve (Diopters) |
|---|---|---|---|---|
| 1 | 75 | 9.49 | 2.03 | 2.04 |
| 2 | 75 | 9.11 | 2.03 | 2.04 |
| 3 | 75 | 7.98 | 4.07 | 4.05 |
| 4 | 75 | 7.63 | 4.07 | 4.09 |

The resultant true curve of each lens 10 is the optical curve of the lens 10 that is measured between opposite sides 46 of the lens 10 along the outside surface 34, as in FIG. 1. The design curve is the tooled curve of the lens 10, namely the measured curve of the convex surface 126 of the mold cavity 104, referring to FIG. 6. Table 2 illustrates that incorporation of the functional portion 14 into the lens 10 in accordance with the present invention causes only essentially no variation between the resultant true curve and the design curve for each of the lenses 10 produced in Examples 1–4.

The lenses 10 made in Examples 1–4 were ground to different finished prescription focal powers and were then found to have good combined power in the spherical and cylindrical axes. Also, the optical properties of the lenses 10, including the optical clarity, optical wave, and optical power, were examined using a conventional lensometer apparatus and were found to be excellent.

The functional portions 14 of each of the lenses 10 were also determined to be well adhered to the respective power portions 12. Also, the functional portions 14 of each of the lenses 10 were tested for delamination and it was observed that the sheets 22, 24 did not delaminate from the functional film 21. Additionally, the outside surface 34 of each lens 10 was tested for abrasion using the test detailed in ASTM D 3359-78 and found to exhibit superior abrasion resistance.

Example 5

This example demonstrates formation of the functional film 21 from polymeric resin and photochromic dye. In this example, the polymeric resin was cellulose acetate butyrate, and the photochromic dye was 3-(4-biphenylyl)-3-phenyl-8-methoxy-3H-naphtho[2,1b]pyran.

The first step is to blend the resin and the photochromic dye. To accomplish this, 0.2 grams of the photochromic dye were mixed with 19.8 grams of pelletized cellulose acetate butyrate in a clean, dry, 250 ml glass Erlenmeyer flask. The pelletized cellulose acetate butyrate was Tenite grade 264-E2R300-01, which is available from Eastman Chemical Co. of Kingsport, Tenn. Next, 110.5 grams of n-butyl acetate solvent were added to the dye/resin mixture. The Erlenmeyer flask was then placed in a heating container that held a suitable heat transfer fluid, e.g. ethylene glycol or diethylene glycol. The heat transfer fluid was heated to gradually warm the dye/resin/solvent mixture to 105° C. The dye/resin/solvent mixture was held at 105° C. and stirred, for about four hours, until the dye and resin dissolved in the solvent and the dye/resin/solvent mixture became homogeneously mixed. The resultant dye solution was then cooled to room temperature.

A 24"×30"×0.375" piece of float glass was prepared for casting the film 21 by first leveling the glass and then cleaning the glass with acetone. Next, a mold release agent was prepared by dissolving one drop of n-octyl-trichloro-silane into 10 ml of xylene. The mold release agent was rubbed on the glass using a clean, folded paper tissue that had been dipped in the mold release agent.

A small puddle of the dye solution, at room temperature, was poured from the Erlenmeyer flask onto the glass. Promptly thereafter, a Gardner Blade, available from the Paul N. Gardner Company of Pompano Beach, Fla., was drawn over the dye solution at a steady rate to spread a uniform sheet of the dye solution across the glass. The n-butyl acetate solvent was allowed to evaporate for about 24 hours at room temperature, leaving the functional film 21 with the photochromic property on the glass.

The functional film 21 was gently removed from the glass by first peeling an edge of the film 21 off the glass with the help of a razor blade. The film 21, after evaporation of the solvent, was determined to be about 0.0013 mm thick.

The film 21 was placed in a spectrometer and the total light transmission without activation of the photochromic dye was determined to be about 92% over the range of the visible spectrum. The total light transmission was determined to be about 10% at 480 nm when the photochromic dye was activated using light provided by a 2.25 mw/cm$^2$ ultraviolet lamp. The maximum activation wavelength for the photochromic dye, (3-(4-biphenylyl)-3-phenyl-8-methoxy-3H-naphtho[2,1b] pyran) was 480 nm. The ultraviolet lamp was a Bondwand lamp available from Edmund Scientific, Inc. of Barrington, N.J.

Example 6

This example demonstrates formation of the functional laminate 19 using the functional film 21 produced in Example 5. First, two sheets of 3.5"×3.5"×0.010" Makrofol® PCEE polycarbonate (color: "nat"; finish: "EE") was obtained from Bayer, Inc. (formerly Miles, Inc.) of Pittsburgh, Pa. The two polycarbonate sheets, which served as the first sheet 22 and the second sheet 24, each included protective layers on both sides of each sheet 22, 24.

The polycarbonate sheet that was to be the first sheet 22 was placed on a hard, flat surface and the protective layer on the side of the sheet 22 facing away from the table was removed. Next, the first adhesive 26, which initially consisted of a one inch diameter puddle of Loctite® FMD-436 adhesive, was applied by syringe to the side of the sheet 22 that no longer included the protective layer. The functional film 21 produced in Example 5 was then carefully placed onto the first adhesive 26 and the first sheet 22. A rolling pin was then used to distribute the first adhesive 26 at a substantially uniform thickness between the film 21 and the sheet 22.

Next, the second adhesive 28, which initially consisted of a one inch diameter puddle of Loctite® FMD-436 adhesive, was applied by syringe to the side of the film 21 facing away from the sheet 22. The protective layer was then removed from one side of the remaining polycarbonate sheet that was to be the second sheet 24. The side of the sheet 24 not including the protective layer was then placed onto the second adhesive 28 and the film 21 to form the functional laminate 19. Pressure applied with a rolling pin was then used to distribute the second adhesive 28 at a substantially uniform thickness between the film 21 and the sheet 24.

The functional laminate 19 was then placed under a ZETA® 7400 ultraviolet lamp, available from Loctite Corporation of Hartford, Conn., for three minutes per side to cure the first and second adhesives 26, 28. The overall thickness of the laminate 19 was determined to be about 0.59 mm. The laminate 19 was then placed in a spectrometer and the total light transmission, without activation of the photochromic dye, was determined to be about 92% over the range of the visible spectrum. The total light transmission was determined to be about 10% at 480 nm when the photochromic dye was activated using light provided by the aforementioned Bondwand 2.25 mw/cm$^2$ ultraviolet lamp.

Example 7

This example demonstrates formation of the functional film 21 from polymeric resin and a different photochromic dye from that used in Example 5. The same procedures, quantities, process conditions were used in this example as in Example 5, with the exception that the photochromic dye used in this example was Photo "D" photochromic dye, a spiro-oxazine dye available from Great Lakes Chemical, Inc. in Pedrengo, Italy. The maximum activation wavelength for the Photo "D" photochromic dye was 613 nm.

After the n-butyl acetate solvent was allowed to evaporate for about 24 hours at room temperature, the functional film 21 with the photochromic property remained on the glass. The functional film 21 was gently removed from the glass by first peeling an edge of the film 21 off the glass with the help of a razor blade. The film 21, after evaporation of the solvent, was determined to be about 0.001 mm thick.

Example 8

This example demonstrates formation of the functional laminate 19 using the same procedure set forth in Example 5, with the exception that the functional film 21 produced in Example 7 was used instead of the functional film 21 produced in Example 5. The functional laminate 19 that was produced in this example using the functional film of Example 7 was determined to have an overall thickness of about 0.30 mm. The laminate 19 of this example was placed in a spectrometer and the total light transmission, without activation of the photochromic dye, was determined to be about 92% over the range of the visible spectrum. The total light transmission was determined to be about 20% at 613 nm when the photochromic dye was activated using light provided by the aforementioned Bondwand 2.25 mw/cm$^2$ ultraviolet lamp.

Example 9

This example demonstrates formation of the lens 10 using the functional laminate 19 produced in Example 8 to incorporate the photochromic property in the lens 10. The first step in making the lens 10 in this example was to cut the plate 17 the functional laminate 19 to make the functional portion 14. The plate 17 was generally round in shape and had substantially the same dimensions as the surface 18 of the power portion 12 to be made. The plate 17, which was not pre-shaped, was placed within the recesses 172 so that the second sheet 24 faced the convex surface 126. The plate 17 was observed to have a snug fit within the recesses 172 that was suitable for creating the mechanical seal. The vacuum source 174 was activated to 28.5 millimeters of mercury to effect the pneumatic seal and to pull the plate 17 into registry with the convex surface 126.

The mold halves 122, 124 were then closed to make the mold cavity 104 using the molding machine 100. Molten Lexan® polycarbonate resin was injected into the cavity 104. The clamping force of the machine 100 used in this example was 160 tons, and the resin injection velocity was 1.5 inches per second. The resin-melt temperature of the machine 100 was 585° F., and the mold temperature was 265° F. After cooling, the mold halves 122, 124 were opened and the lens 10, was ejected from the mold half 122. It was noted that no injected polycarbonate flowed between the plate 17 and the convex surface 126. Additionally, no delamination of the functional portion 14 and no warping of the functional film 21 was observed. Furthermore, the functional portion 14 and the power portion 12 were found to be firmly attached to each other. No voids or inclusions were found anywhere in the power portion 12, including proximate the functional portion 14. After the inspection, the second sheet 24 of the lens 10 was coated with the coating 32 using a conventional dip-coating technique.

Various tests were carried out on the lens produced in this example. The lens 10 of this example was placed in a spectrometer and the total light transmission, measured through the power portion 12 and the functional portion 14 without activation of the photochromic dye, was determined to be about 90% over the range of the visible spectrum. The total light transmission measured through the power portion 12 and the functional portion 14 of the lens 10 was determined to be about 20% at 613 nm when the photochromic dye was activated using light provided by the aforementioned Bondwand 2.25 mw/cm$^2$ ultraviolet lamp.

The lens 10 was ground to a finished prescription focal power and was found to have good combined power in the spherical and cylindrical axes. Also, the optical properties of the lens 10, including the optical clarity, optical wave, and optical power, were examined using a conventional lensometer apparatus and were found to be excellent.

Also, the functional portion 14 of the lens 10 was tested for delamination and it was observed that the sheets 22, 24 did not delaminate from the functional film 21. Additionally, the outside surface 34 of the lens 10 was tested for abrasion using the test detailed in ASTM D 3359-78 and found to exhibit superior abrasion resistance.

Example 10

This example demonstrates formation of the functional film 21 from polymeric resin and a different photochromic dye from that used in Example 5. The same procedures and process conditions were used in this example as in Example 5, with the exception that the amount of the cellulose acetate butyrate used, the amount of the photochromic dye used, and the composition of the photochromic dye were changed.

The amount of the cellulose acetate butyrate used in this example was 19.58 grams. The photochromic dye used in this example was a mixture that included 0.2 grams of the 3-(4-biphenylyl)-3-phenyl-8-methoxy -3H-naphtho[2,1b] pyran photochromic dye used in Example 5, 0.2 grams of the Photo "D" photochromic dye used in Example 7, and 0.02 grams of Photo "PNO" photochromic dye, which is a spirooxazine dye available from Great Lakes Chemical, Inc. in Pedrengo, Italy. The maximum activation wavelength for the 3-(4-biphenylyl)-3-phenyl-8-methoxy-3H-naphtho[2,1b] pyran photochromic dye is 480 nm, the maximum activation wavelength for the Photo "D" photochromic dye is 613 nm, and the maximum activation wavelength for the Photo "PNO" photochromic dye is 540 nm. When activated with sunlight, this mixture of the three different photochromic dyes achieves a neutral grey color, which is a desirable activated color for ophthalmic sunglasses.

After the n-butyl acetate solvent was allowed to evaporate for about 24 hours at room temperature, the functional film 21 with the photochromic property remained on the glass. The functional film 21 was gently removed from the glass by first peeling an edge of the film 21 off the glass with the help of a razor blade. The film 21, after evaporation of the solvent, was determined to be about 0.00122 mm thick.

Example 11

This example demonstrates formation of the functional laminate 19 using the same procedure set forth in Example 5, with the exception that the functional film 21 produced in Example 10 was used instead of the functional film 21 produced in Example 5. The functional laminate 19 that was produced in this example using the functional film of Example 11 was determined to have an overall thickness of about 0.30 mm. The laminate 19 of this example was placed in a spectrometer and the total light transmission, without activation of the photochromic dye, was determined to be about 90% over the range of the visible spectrum (i.e.: from about 400 nm to about 700 nm). The average total light transmission was determined to be about 25% over the range of the visible spectrum (i.e.: from about 400 nm to about 700 nm) when the photochromic dye was activated using light provided by the aforementioned Bondwand 2.25 mw/cm$^2$ ultraviolet lamp.

Example 12

This example demonstrates formation of the lens 10 that is stepped multi-focal, as in FIG. 4. The lens 10 of FIG. 4 was made using the functional laminate 19 produced in Example 11 to incorporate the photochromic property in the lens 10. The procedures of this example were the same as those used in Example 9, with two exceptions. First, the functional laminate 19 of Example 11, rather than the functional laminate of Example 8, was used in this example. Second, the lens 10 of FIG. 4, rather than the lens 10 of FIG. 1, was produced in this example.

The convex surface 126 of the molding machine 100 used in this example was stepped and discontinuous, as compared to the continuous nature of the convex surface 126 of Example 9. The plate 17, which was not pre-shaped, was placed within the recesses 172 so that the second sheet 24 faced the convex surface 126. The plate 17 was observed to have a snug fit within the recesses 172 that was suitable for creating the mechanical seal. The vacuum source 174 was activated to 28.5 millimeters of mercury to effect the pneumatic seal and to pull the plate 17 into registry with the convex surface 126.

The mold halves 122, 124 were then closed to make the mold cavity 104. Molten Lexan® polycarbonate resin was subsequently injected into the cavity 104. After cooling, the mold halves 122, 124 were opened and the lens 10 was ejected from the mold half 122. Upon opening the mold cavity 104, it was noted that no injected polycarbonate flowed between the plate 17 and the convex surface 126. Additionally, no delamination of the functional portion 14 and no warping of the functional film 21 was observed. Also, it was observed that the functional portion 14 accurately conformed to the shape of the front surface 18 of the power portion 12, including the main focal surface 36, the secondary focal surface 38, and the stepped surface 40 of the power portion. Furthermore, the functional portion 14 and the power portion 12 were found to be firmly attached to each other. No voids or inclusions were found anywhere in the power portion 12, including proximate the functional portion 14. After the inspection, the second sheet 24 of the lens 10 was coated as specified in Example 9.

Various tests were carried out on the lens produced in this example. The lens 10 of this example was placed in a spectrometer and the total light transmission, measured through the power portion 12 and the functional portion 14 without activation of the photochromic dye, was determined to be about 90% over the range of the visible spectrum (i.e.: from about 400 nm to about 700 nm). The average total light transmission measured through the power portion 12 and the functional portion 14 of the lens 10 was determined to be about 25% over the range of the visible spectrum (i.e.: from about 400 nm to about 700 nm) when the photochromic dye was activated using light provided by the aforementioned Bondwand 2.25 mw/cm$^2$ ultraviolet lamp.

The lens 10 of this example was ground to a finished prescription focal power and was found to have good combined power in the spherical and cylindrical axes. Also, the lens 10 of this example was determined to have a 6.25 diopter curve with a 1.02 multi-focal additive power. Furthermore, the optical properties of the lens 10, including the optical clarity, optical wave, and optical power, were examined using a conventional lensometer apparatus and were found to be excellent.

Also, the functional portion 14 of the lens 10 was tested for delamination and it was observed that the sheets 22, 24 did not delaminate from the functional film 21. Additionally, the outside surface 34 of the lens 10 was tested for abrasion using the test detailed in ASTM D 3359-78 and found to exhibit superior abrasion resistance.

Although the present invention has been described with reference to preferred embodiments, workers skilled in the art will recognize that changes may be made in form and detail without departing from the spirit and scope of the invention.

What is claimed is:

1. A functional laminate disposed on an injection molded eye lens formed in a mold comprising:
    a first resinous layer;
    a second resinous layer;
    a polymeric functional layer disposed between said first and second resinous layer;
    said first resinous layer having an outer side serving as a front surface of said injection molded eye lens;

said second resinous layer being integral with a molded layer of said injection molded eye lens such that any thickness variation in said laminate is compensated by said molded layer;

an adhesive adhering said polymeric functional layer to both said first and second resinous layer; and said adhesive formulated to have sufficient flexibility so as to substantially prevent crazing during injection molding of said lens;

said functional laminate having a center thickness in the range of about 0.2 mm to about 2 mm on said injection molded lens;

said functional laminate having a generally rounded shape and having cut edges such that said functional laminate has an outer dimension that snugly conforms to an outer dimension of said injection molded eye lens according to the formation of said outer dimension of said injection molded eye lens in said mold; and, said outer side of said first resinous layer being substantially free of optical and cosmetic defects as a result of said cut edges snugly conforming to said outer dimension of said injection molded eye lens during injection molding thereof.

2. A functional laminate according to claim 1, said adhesive formulated to also substantially prevent yellowing of said adhesive upon exposure of said lens to sunlight.

3. A functional laminate according to claim 1, said adhesive formulated to also minimize shrinkage during curing of said molded lens.

4. A functional laminate according to claim 1, wherein said adhesive is selected from the group consisting of acrylic-type, epoxy-type and urethane-type adhesives.

5. A functional laminate according to claim 4, wherein said adhesive is a urethane adhesive.

6. A functional laminate according to claim 1, wherein said injection molded eye lens has a prescription power.

7. A functional laminate according to claim 1, wherein said injection molded eye lens has no prescription power.

8. A functional laminate according to claim 1, wherein said polymeric functional layer is a polarizing layer.

9. A functional laminate according to claim 1, wherein said polymeric functional layer is a photochromic layer.

10. A functional laminate as set forth in claim 1, wherein said outer dimension of said functional laminate also snugly conforms to a cavity of said mold so as to form a mechanical seal in said cavity during said injection molding of said injection molded eye lens.

11. A functional laminate as set forth in claim 1, wherein said outer dimension of said functional laminate also snugly conforms to a cavity of said mold so as to allow the formation of a pneumatic seal in said cavity during said injection molding of said injection molded eye lens.

12. A functional laminate as set forth in claim 1, wherein said outer dimension of said functional laminate also snugly conforms to a cavity of said mold so as to allow the formation of a combined mechanical and pneumatic seal in said cavity during said injection molding of said injection molded eye lens.

13. A functional laminate as set forth in claim 1, wherein said functional laminate has a completely rounded shape.

14. A functional laminate as set forth in claim 1, wherein said injection molded eye lens is a progressive lens.

15. A functional laminate as set forth in claim 1, wherein said injection molded eye lens is a multifocal lens.

16. A functional laminate as set forth in claim 1, wherein said injection molded eye lens is a bifocal lens.

17. A functional laminate as set forth in claim 6, wherein said injection molded eye lens has a progressive prescription power.

18. A functional laminate disposed on an injection molded eye lens formed in a mold comprising:

a first resinous layer;

a second resinous layer;

a polymeric functional layer disposed between said first and second resinous layer;

said first resinous layer having an exposed side serving as a front surface of said injection molded eye lens;

said second resinous layer being integral with a molded layer of said injection molded eye lens such that any thickness variation in said laminate is compensated by said molded layer;

an adhesive substance joining said polymeric functional layer to both said first and second resinous layer;

said functional laminate having a generally rounded shape and having cut edges such that said functional laminate has an outer dimension that substantially conforms to an outer dimension of said injection molded eye lens, said outer dimension of said injection molded eye lens being determined by a cavity size of said mold; and, said exposed side of said first resinous layer being substantially free of optical and cosmetic defects as a result of said cut edges substantially conforming to said outer dimension of said injection molded eye lens during injection molding thereof.

19. A functional laminate according to claim 18, said adhesive substance formulated to substantially prevent yellowing of said adhesive substance upon exposure of said lens to sunlight.

20. A functional laminate according to claim 18, said adhesive substance formulated to minimize shrinkage during curing of said molded lens.

21. A functional laminate according to claim 18, wherein said adhesive substance is selected from the group consisting of acrylic-type, epoxy-type and urethane-type adhesives.

22. A functional laminate according to claim 21, wherein said adhesive substance is a urethane adhesive.

23. A functional laminate according to claim 18, wherein said injection molded eye lens has a prescription power.

24. A functional laminate according to claim 18, wherein said injection molded eye lens has no prescription power.

25. A functional laminate according to claim 18, wherein said polymeric functional layer is a polarizing layer.

26. A functional laminate according to claim 18, wherein said polymeric functional layer is a photochromic layer.

27. A functional laminate as set forth in claim 18, wherein said functional laminate has a completely rounded shape.

28. A functional laminate as set forth in claim 18, wherein said injection molded eye lens is a progressive lens.

29. A functional laminate as set forth in claim 18, wherein said injection molded eye lens is a multifocal lens.

30. A functional laminate as set forth in claim 18, wherein said injection molded eye lens is a bifocal lens.

31. A functional laminate as set forth in claim 23, wherein said injection molded eye lens has a progressive prescription power.

32. A functional laminate as set forth in claim 18, wherein said outer dimension of said functional laminate also substantially conforms to said cavity size of said mold in a manner so as to allow the formation of a mechanical seal with said cavity during said injection molding of said injection molded eye lens.

33. A functional laminate as set forth in claim 18, wherein said outer dimension of said functional laminate also substantially conforms to said cavity size of said mold in a manner so as to allow the formation of a pneumatic seal with said cavity during said injection molding of said injection molded eye lens.

34. A functional laminate as set forth in claim 18, wherein said outer dimension of said functional laminate also substantially conforms to said cavity size of said mold in a manner so as to allow the formation of a combined mechanical and pneumatic seal with said cavity during said injection molding of said injection molded eye lens.

* * * * *